US007753515B2

(12) United States Patent  
Tokuda et al.

(10) Patent No.: US 7,753,515 B2  
(45) Date of Patent: Jul. 13, 2010

(54) INK SET, INK JET RECORDING METHOD, INK CARTRIDGE, RECORDING UNIT, INK-JET RECORDING APPARATUS, AND IMAGE FORMATION METHOD

(75) Inventors: Yui Tokuda, Yokohama (JP); Tomonari Watanabe, Kawasaki (JP); Mikio Sanada, Yokohama (JP); Masashi Ogasawara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 116 days.

(21) Appl. No.: 11/269,730

(22) Filed: Nov. 9, 2005

(65) Prior Publication Data

US 2006/0066699 A1 Mar. 30, 2006

Related U.S. Application Data

(63) Continuation of application No. PCT/JP2005/008840, filed on May 10, 2005.

(30) Foreign Application Priority Data

May 10, 2004 (JP) ............................. 2004-140282

(51) Int. Cl.  
*G01D 11/00* (2006.01)

(52) U.S. Cl. .................................... 347/100; 106/31.13

(58) Field of Classification Search ................. 347/100; 106/31.13

See application file for complete search history.

(56) References Cited

U.S. PATENT DOCUMENTS 5,451,251 A 9/1995 Mafune et al. ............ 106/22 H 5,571,313 A 11/1996 Mafune et al. ............ 106/22 H  
5,835,116 A 11/1998 Sato et al. ..................... 347/98

(Continued)

FOREIGN PATENT DOCUMENTS

EP 1 405 882 A1 4/2004

(Continued)

OTHER PUBLICATIONS

Dec. 4, 2006 International Preliminary Report on Patentability and Written Opinion in PCT/JP2005/008840.

(Continued)

*Primary Examiner*—Manish S Shah  
*Assistant Examiner*—Laura E Martin  
(74) *Attorney, Agent, or Firm*—Fitzpatrick, Cella, Harper & Scinto

(57) ABSTRACT

In an ink set, which is an ink set (A) obtained by combining a plurality of aqueous inks (a) and used together with an aqueous ink (B) containing a water-insoluble coloring material, respective aqueous inks constituting the ink set (A) contain at least one water-soluble organic solvent serving as a poor solvent for the water-insoluble coloring material contained in the aqueous ink (B), and among the water-soluble organic solvents which are respectively contained in the aqueous ink (a) and serve as a poor solvent, at least one water-soluble organic solvent has a vapor pressure at 20° C. that is lower than the vapor pressure of water at 20° C. The ink set can form a full-color image in which occurrence of bleeding at boundaries between different adjacent color regions of the image has been suppressed.

20 Claims, 11 Drawing Sheets

U.S. PATENT DOCUMENTS

| | | | |
|---|---|---|---|
| 5,911,815 A | 6/1999 | Yamamoto et al. | 106/31.27 |
| 6,027,210 A | 2/2000 | Kurabayashi et al. | 347/100 |
| 6,062,674 A | 5/2000 | Inui et al. | 347/43 |
| 6,174,354 B1 | 1/2001 | Takizawa et al. | 106/31.43 |
| 6,221,141 B1 | 4/2001 | Takada et al. | 106/31.6 |
| 6,238,045 B1 | 5/2001 | Ono et al. | 347/96 |
| 6,260,947 B1 * | 7/2001 | Pinkernell | 347/43 |
| 6,280,513 B1 | 8/2001 | Osumi et al. | 106/31.6 |
| 6,332,919 B2 | 12/2001 | Osumi et al. | 106/31.6 |
| 6,367,923 B1 * | 4/2002 | Koitabashi | 347/101 |
| 6,375,317 B1 | 4/2002 | Osumi et al. | 347/100 |
| 6,398,355 B1 | 6/2002 | Shirota et al. | 347/100 |
| 6,412,936 B1 | 7/2002 | Mafune et al. | 347/100 |
| 6,425,662 B1 | 7/2002 | Teraoka et al. | 347/100 |
| 6,511,534 B1 | 1/2003 | Mishina et al. | 106/31.33 |
| 6,521,034 B1 | 2/2003 | Osumi et al. | 106/31.6 |
| 6,530,656 B1 * | 3/2003 | Teraoka et al. | 347/100 |
| 6,547,381 B2 | 4/2003 | Watanabe et al. | 347/100 |
| 6,562,117 B2 * | 5/2003 | Sano et al. | 106/31.6 |
| 6,706,105 B2 | 3/2004 | Watanabe et al. | 106/31.6 |
| 6,733,120 B2 | 5/2004 | Ogasawara et al. | 347/100 |
| 7,005,461 B2 | 2/2006 | Sanada et al. | 523/160 |
| 7,160,376 B2 | 1/2007 | Watanabe et al. | 106/31.6 |
| 2004/0035323 A1 * | 2/2004 | Suzuki et al. | 106/31.65 |
| 2004/0155946 A1 | 8/2004 | Nagai | 347/100 |
| 2005/0024458 A1 | 2/2005 | Sanada et al. | 347/100 |
| 2006/0089424 A1 | 4/2006 | Sanada et al. | 523/160 |
| 2006/0096498 A1 | 5/2006 | Tsujimura et al. | 106/31.27 |
| 2006/0098067 A1 | 5/2006 | Imai et al. | 347/100 |
| 2006/0098068 A1 | 5/2006 | Hakamada et al. | 347/100 |
| 2006/0100311 A1 | 5/2006 | Tokuda et al. | 523/160 |
| 2006/0103703 A1 | 5/2006 | Nito et al. | 347/100 |
| 2006/0103704 A1 | 5/2006 | Hakamada et al. | 347/100 |
| 2006/0132568 A1 | 6/2006 | Watanabe et al. | 347/100 |
| 2006/0135647 A1 | 6/2006 | Ichinose et al. | 523/160 |

FOREIGN PATENT DOCUMENTS

| | | |
|---|---|---|
| EP | 1405882 A1 * | 4/2004 |
| EP | 1 577 353 A1 | 9/2005 |
| JP | 2000-63719 | 2/2000 |
| JP | 2000-198955 | 7/2000 |
| JP | 2003-41172 | 2/2003 |
| JP | 2003-113337 | 4/2003 |

OTHER PUBLICATIONS

May 11, 2009 European Search Report in European Patent Appln. No. 05739036.1.

* cited by examiner

INK SET, INK JET RECORDING METHOD, INK CARTRIDGE, RECORDING UNIT, INK-JET RECORDING APPARATUS, AND IMAGE FORMATION METHOD

This application is a continuation of International Application No. PCT/JP2005/008840, filed May 10, 2005, which claims the benefit of Japanese Patent Application No. 2004-140282, filed May 10, 2004.

BACKGROUND OF THE INVENTION

1. Field of the Invention

The present invention relates to an ink set and, more particularly, to an ink jet recording method and an ink jet recording apparatus using an ink jet method, as well as an ink set suitably used for an image formation method.

2. Related Background Art

It has conventionally been known that an ink (pigment ink, etc.) that contains a water-insoluble coloring material as colorant produces an image excellent in toughness including water resistance, light resistance, and the like. In recent years, various techniques have been proposed for the purposes of further increasing the optical density of the image formed by such an ink and effectively suppressing occurrence of bleeding at the boundaries between different color regions in the case where recording of a color image in which the respective color-regions are situated adjacently to one another is performed. For example, a technique of further increasing the image density by using an ink containing a self-dispersible carbon black and certain salt has been proposed (refer to, for example, Japanese Patent Application Laid-Open No. 2000-198955).

Also proposed is a technique of attaching an ink jet recording ink which is a composition containing a pigment, a polymer particle, a water-soluble organic solvent, and water and aqueous solution containing polyvalent metal salt to a recording medium, followed by reaction of the ink composition with the aqueous solution containing polyvalent metal salt to form a high-quality image (refer to, for example, Japanese Patent Application Laid-Open No. 2000-63719). In either case, the pigment existing, in a dispersed state, in the ink is forcibly agglomerated on the surface of the recording medium to suppress permeation of the pigment into the recording medium, thereby further increasing the image density and further suppressing the bleeding in the image, as compared to the case of the image obtained by using a conventional pigment ink.

As described above, means of adding a special compound such as one that prompts the pigment in the ink to become massed together, reacting two or more types of liquid components, or the like has been mainly used to obtain a high-quality image in which the density thereof is increased and occurrence of the bleeding is suppressed.

SUMMARY OF INVENTION

Under the circumstances, the present inventors carried out extensive studies for the purpose of forming a high-quality image that is the same as that obtained in the above case by adequately controlling design, combination, and the like of basic components constituting aqueous ink, such as a coloring material and a water-soluble organic solvent, without using a special compound and liquid. As a result, the inventors reached a conclusion on the basis of the studies that it is possible to provide an ink set, obtained by combining a plurality of aqueous inks, that is effective for bleeding suppression and thereby is capable of forming a high-quality image, by working out an ink system in which an ink composition is functionally separated and in which mutual interaction between the coloring material and the water-soluble organic solvent is utilized.

An object of the present invention is, therefore, to provide an ink set, which is obtained by combining a plurality of aqueous inks (hereinafter, referred to as merely "ink", in some cases), capable of suppressing occurrence of the bleeding at the boundaries between different color-regions in the case where a full-color image in which the respective color-regions are situated adjacently to one another is formed.

Another object of the present invention is to provide an ink jet recording method capable of suppressing the occurrence of the bleeding and thereby forming a high-quality image by using the above ink set.

Still another object of the present invention is to provide an ink cartridge, a recording unit, and an ink jet recording apparatus suitably used for the above ink jet recording method.

Yet another object of the present invention is to provide an image formation method capable of effectively suppressing the bleeding at the boundaries between different color regions that may occur at the time of formation on a recording medium of a color image in which different color regions are situated adjacently to one another.

The above objects are achieved by the following inventions.

An ink set according to the present invention, which is an ink set (A) obtained by combining a plurality of aqueous inks (a) and is used together with an aqueous ink (B) containing a water-insoluble coloring material, is characterized in that respective aqueous inks (a) constituting the ink set (A) contain at least one water-soluble organic solvent serving as a poor solvent for the water-insoluble coloring material contained in the aqueous inks (B), and among the water-soluble organic solvents which are respectively contained in the aqueous ink (a) and serve as a poor solvent, at least one water-soluble organic solvent has a vapor pressure at 20° C. that is lower than the vapor pressure of water at 20° C.

An ink jet recording method according to the present invention is characterized by comprising a step of ejecting the aqueous inks (a) constituting the ink set (A) with an ink jet method.

An ink cartridge according to the present invention comprising a plurality of ink storage portions for storing inks is characterized in that the ink cartridge stores a plurality of aqueous inks (a) constituting the ink set (A).

A recording unit according to the present invention is characterized by comprising an ink storage portion for storing respective aqueous inks (a) constituting the ink set (A) and an ink jet head for ejecting the respective aqueous inks (a) constituting the ink set (A).

An ink jet recording apparatus according to the present invention is characterized by comprising an ink storage portion for storing respective aqueous inks (a) constituting the ink set (A) and an ink jet head for ejecting the respective aqueous inks (a) constituting the ink set (A).

An image formation method according to the present invention that uses a plurality of aqueous inks (a) constituting the ink set (A) and an aqueous ink (B) containing the water-insoluble coloring material to form an image in which an image formed by the aqueous inks (a) constituting the ink set (A) and image formed by the aqueous ink (B) containing the water-insoluble coloring material are situated adjacently to each other is characterized by comprising: performing first scanning for applying the aqueous ink (B) containing the water-insoluble coloring material to form an image; and performing second scanning for applying at least one of the plurality of aqueous inks (a) constituting the ink set (A) on the area where the image has been formed.

An ink jet recording method according to the present invention comprising a step of ejecting a plurality of aqueous inks (a) constituting an ink set (A) and aqueous ink (B) containing at least a water-insoluble coloring material with an ink jet method is characterized in that respective aqueous inks (a) constituting the ink set (A) contain a water-soluble organic solvent serving as a poor solvent for the water-insoluble coloring material contained in the aqueous ink (B), and among the water-soluble organic solvents serving as a poor solvent, at least one water-soluble organic solvent has a vapor pressure at 20° C. lower than the vapor pressure of water at 20° C.

According to the present invention, there is provided an ink set (A) comprising a plurality of aqueous inks (a) that can suppress occurrence of the bleeding at the boundaries between different color-regions in the case where recording of an image in which the respective color regions are situated adjacently to one another is performed using the aqueous ink (B) containing a water-insoluble coloring material and the plurality of aqueous inks (a).

Further, according to the present invention, by using the ink set (A), it is possible to provide an ink jet recording method that can form a high-quality image in which occurrence of the bleeding has been suppressed, an ink cartridge, a recording unit, and an ink jet recording apparatus suitably used for the above ink jet recording method.

Further, according to the present invention, there is provided an image formation method capable of effectively suppressing occurrence of the bleeding at the boundaries in the case where recording of the image in which the respective color regions are situated adjacently to one another is performed for a plain paper.

DESCRIPTION OF THE PREFERRED EMBODIMENTS

Figure 1:
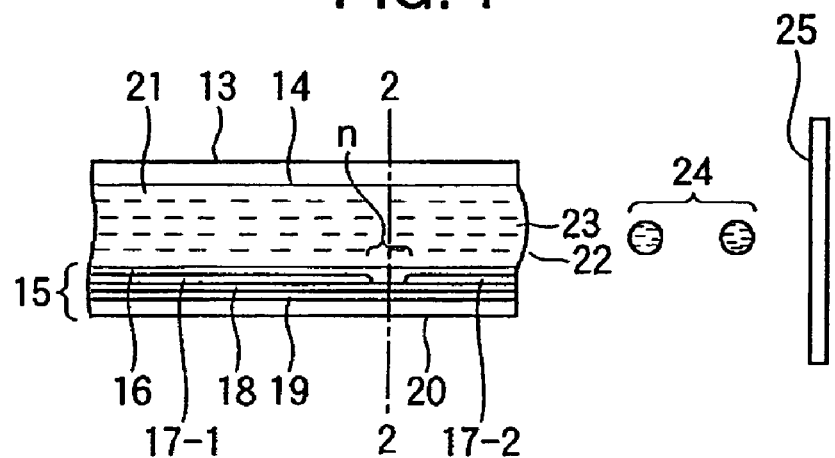
FIG. 1 is a vertical cross-sectional view of a recording head taken along an ink path.

The present invention will be described in detail based on a preferred embodiment.

In the present invention, "ink set (A)" or "ink set" may have any of the configurations described below, as long as the ink set includes a combination of a plurality of aqueous inks (a). An ink set constituted by an ink tank obtained by integrating four ink tanks respectively containing a black ink, cyan ink, magenta ink, and yellow ink into a single unit or an ink set constituted by an ink tank with a head having the above configuration; an ink set constituted by an ink tank obtained by integrating three ink tanks respectively containing a cyan ink, magenta ink, and yellow ink into a single unit or an ink set constituted by an ink tank with a head having the above configuration; an ink set having a configuration in which the individual ink tanks containing the inks as described above can be detachably attached to a recording apparatus, or the like can be taken as an example of the above "ink set (A)" or "ink set." The present invention defines characteristics of a plurality of aqueous inks (a) that constitute the ink set (A) in a relative manner between the plurality of aqueous inks. Therefore, the configuration of the ink set is not limited to the above, but can be any configuration as long as a combination of a plurality of aqueous inks that satisfies the definition of the characteristics in the aqueous ink is used.

[Effect of Coloring Material and Water-Soluble Organic Solvent Serving as a Poor Solvent for Coloring Material]

The reason why the above effect can be provided by the present invention is unclear, but the present inventors estimate as follows.

Assume that recording of an image in which different color regions are situated adjacently to one another is performed for a recording medium like a plain paper with an image formed by a plurality of aqueous inks. In this case, in order to obtain an image in which occurrence of bleeding at the boundaries between the respective color regions has been suppressed, it is necessary to suppress the outflow of the coloring material to adjacent region in the boundaries of the image. To that end, what is important is that the coloring material needs to become massed together as quickly as possible after the ink has been put on the paper.

In the present invention, a water-soluble organic solvent that does not allow a water-insoluble coloring material to be stably dispersed is defined as "poor solvent" for the water-insoluble coloring material. As a basic configuration of the present invention, an aqueous ink (B) containing a water-insoluble coloring material and an aqueous ink (a) containing a water-soluble organic solvent serving as a poor solvent for the water-insoluble coloring material are used together to form an image, thereby trying to achieve the abovementioned effect. That is, by applying the aqueous ink (a) containing a water-soluble organic solvent serving as a poor solvent on a recording medium after the aqueous ink (B) containing a water-insoluble coloring material has been applied on the recording medium, a mechanism in which dispersibility of the water-insoluble coloring material at the boundaries of the image becomes unstable to result in an aggregation can be brought about more quickly.

According to examination made by the present inventors, the condition for the water-soluble organic solvent to serve as a poor solvent for the target water-insoluble coloring material includes relative permittivity of the water-soluble organic solvent. Hereinafter, how the relative permittivity of the water-soluble organic solvent acts on the water-insoluble coloring material will be described by taking the case where the water-insoluble coloring material is a pigment as an example.

In the case where at least one ionic group is bonded directly or through another atomic group to the surface of a pigment to be used, the ionic group undergoes ionic dissociation in a medium to allow the pigment particle to acquire charge. The electrostatic repulsion caused at this time becomes one factor in allowing the pigment particle to be dispersed in the medium. Attractive force between ions in the medium can be taken as an index of the ion dissociation. It is known that in the case where charges $q_1$ and $q_2$ having polarities different from each other are spaced away from each other by a distance of r in a medium having a relative permittivity $\in_r$ relative to an electric constant $\in_0$, the attractive force F between the two charges can be represented by the following equation (1).

$$F = \frac{q_1 q_2}{4\pi \varepsilon_r \varepsilon_0 r^2} \quad \text{Equation (1)}$$

It can be considered that the above equation (1) is applicable to the ionic group bonded to the pigment surface. As the attractive force F becomes increased, the distance between the ion and its counter ion becomes shorter, or ions are completely coupled to each other to reduce the charge amount of the pigment particle or to compress an electric double layer, with the result that electrostatic repulsion is weakened to make the dispersion of the pigment unstable. As is clear from the above equation (1), in the case where the water-soluble organic solvent having a small relative dielectric constant $\in_r$ relative to electric constant $\in_0$ is used, the attractive force F between ions of the ion functional group bonded to the pigment surface is increased to prevent the ionic group of the pigment from substantially undergoing the ionic dissociation in the water-soluble organic solvent, resulting in reduction of the dispersibility of the pigment caused by the electrostatic repulsion.

From the above, the following can be presumed. That is, an ink set obtained by combining a plurality of aqueous inks (a) containing a water-soluble organic solvent having a small relative permittivity and the aqueous ink (B) containing a water-insoluble coloring material having an ionic group is used, and the aqueous ink (B) and respective aqueous inks (a) constituting the ink set (A) are applied on a recording medium to allow these aqueous inks to come into contact with each other on the recording medium to thereby reduce the charge amount of the water-insoluble coloring material having an ionic group, making the dispersion of the water-insoluble coloring material unstable, with the result that the water-insoluble coloring material becomes massed together.

Therefore, in the present invention, the ink set (A) obtained by combining a plurality of aqueous inks (a) of different colors is used together with the aqueous ink (B) containing a water-insoluble coloring material, and the aqueous inks (a) that constitute the ink set (A) respectively contain a water-soluble organic solvent serving as a poor solvent for the water-insoluble coloring material contained in the aqueous ink (B). As a result, in the case where the ink set according to the present invention is used to form a full-color image in which different color regions are situated adjacently to one another, a high-quality image in which occurrence of the bleeding at the boundaries between the respective color regions has been suppressed can be obtained.

[Image Formation Mechanism]

An image formation mechanism will be described with an example.

Figure 18A:
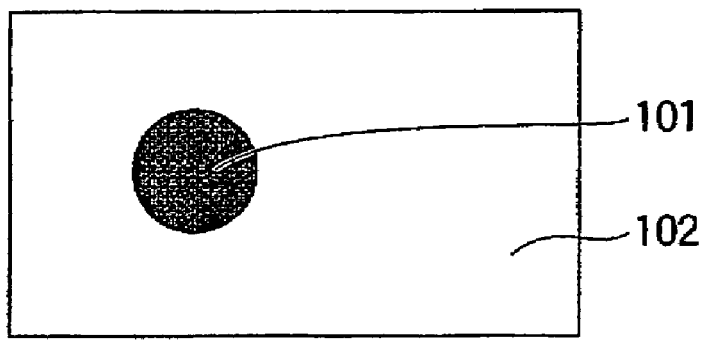
FIGS. 18A, 18B, and 18C are views for schematically explaining a state when an aqueous ink constituting an ink set according to the present invention is put on the surface of a recording medium.
Figure 18B:
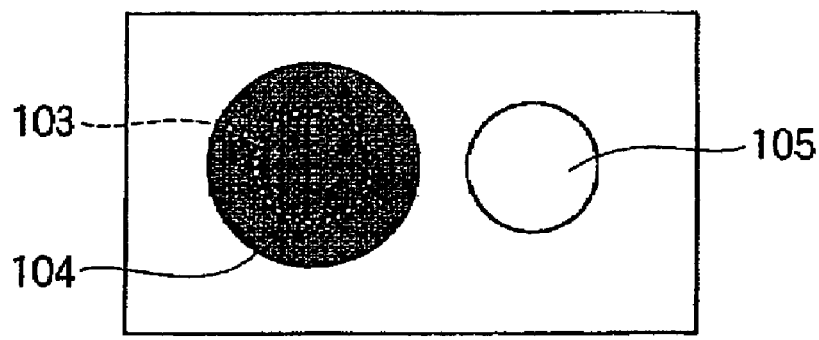
Figure 18C:
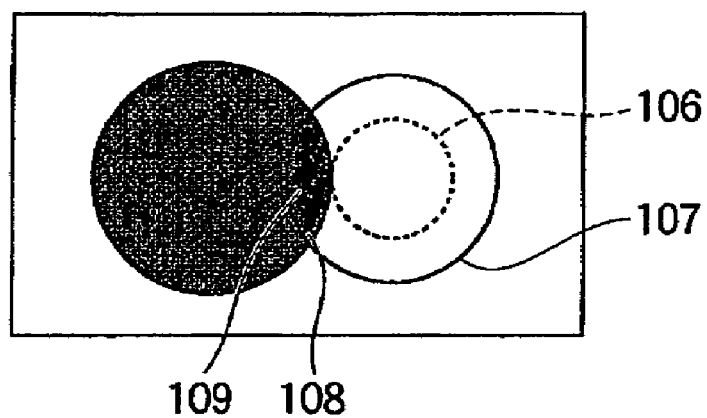

As shown in FIG. 18A, firstly an ink 101 containing a water-insoluble coloring material is put on a recording medium 102. Moisture evaporation and permeation into the recording medium gradually progress in the ink drop that has been applied on the recording medium, with the result that a dot area 104 larger than an area 103 covered by the ink drop immediately after being applied is formed as shown in FIG. 18B. Subsequently, an ink 105 containing a water-soluble organic solvent serving as a poor solvent for the water-insoluble coloring material is put on a portion near the ink 101 containing the water-insoluble coloring material that has been applied previously. The ink drop penetrates into the recording medium 102 and then spreads, with the result that a dot area 107 larger than an area 106 covered by the ink drop immediately after being applied is formed as shown in FIG. 18C, as in the case of the ink 101 containing the water-insoluble coloring material. As the dot area 104 of the ink 101 and dot area 107 of the ink 105 are gradually increased, two inks start mixing with each other at the outer circumferential portions of the dots, forming an ink mixing area 108, as shown in FIG. 18C. In the ink mixing area 108, the solvent compositions of the inks 101 and 105 are locally changed.

On the other hand, particularly in the case where the ink 101 containing a water-insoluble coloring material comprises a water-insoluble coloring material including an ionic group and a water-soluble organic solvent having a relative permittivity $\in_{s1}$ such as one that can disperse the water-insoluble coloring material in a relatively stable manner, the ionic group of the water-insoluble coloring material contained in the ink 101 sufficiently undergoes ionic dissociation before the ink drop of the ink 101 has been mixed with the ink drop of the ink 105, such that the water-insoluble coloring material maintains its dispersibility.

However, when the ink 101 containing a water-insoluble coloring material and ink 105 containing a water-soluble organic solvent having a relative permittivity $\in_{s2}$ ($\in_{s1}>\in_{s2}$) and serving as a poor solvent for the water-insoluble coloring material are mixed with each other, the density of the water-soluble organic solvent having the relative permittivity $\in_{s2}$ increases at the portion near the water-insoluble coloring material. Then, according to the process as described above, the charge amount of the particle of the water-insoluble coloring material is reduced or an electric double layer is compressed, with the result that electrostatic repulsion is weakened to make the dispersion of the water-insoluble coloring material unstable. When an aggregation reaction is accelerated as described above, the aggregated water-insoluble coloring material 109 forms weirs at the boundary portion between the two inks as shown in FIG. 18C. It can be considered that, as a result of this, the weirs thus formed play a role of preventing the water-insoluble coloring material from being spread, thereby suppressing occurrence of the bleeding at the boundaries between respective color images formed by ink drops of the inks 101 and 105.

As can be seen from the above, it is preferable for the relative permittivity $\in_{s1}$ relative to the electric constant $\in_0$ of the water-soluble organic solvent whose content is the highest among the water-soluble organic solvents in the ink 101 containing a water-insoluble coloring material and the relative permittivity $\in_{s2}$ relative to the electric constant $\in_0$ of the water-soluble organic solvent, which is allowed to be contained in the ink 105 and serves as a poor solvent for the water-insoluble coloring material in the ink 101, to satisfy $\in_{s1} > \in_{s2}$.

Further, according to the examination by the present inventors, when the upper limit of the relative permittivity $\in_{s1}$ of the water-soluble organic solvent whose content is the highest among the water-soluble organic solvent or solvents in the aqueous ink (B) containing the water-insoluble coloring material is 35 or less at room temperture (for example, 25° C.), more preferably 30 or less at room temperature (for example, 25° C.), the effect of the present invention can be further exhibited. The lower limit is preferably more than 0, and more preferably more than 1.

Although the relative permittivity of the water-soluble organic solvent having a vapor pressure higher than water, such as alcohols, is relatively small, the evaporation rate of these water-soluble organic solvents after the ink has been applied on the recording medium is very high. Therefore, when the ink that contains alcohols as the water-soluble organic solvent serving as a poor solvent for the water-insoluble coloring material contained in the ink (B) is applied on the recording medium at the portion near the image formed by the ink (B) containing the water-insoluble coloring material, which has previously been applied, the alcohols having a high vapor pressure have evaporated before the mixing area 108 shown in FIG. 18C has been formed. Therefore, the density of the alcohols having an effect as a poor solvent is reduced, with the result that an aggregation of the water-insoluble coloring material is not greatly accelerated. Thus, in view of the definition of a poor solvent, which will be described later, it can be considered that the water-soluble organic solvent with volatility higher than that of water does not have an effect that makes unstable the dispersion of the water-insoluble coloring material in the aqueous ink. This has revealed that even if the water-soluble organic solvent, such as alcohols, having a very high evaporation rate, that is, having a vapor pressure higher than that of water, is used as a poor solvent for the water-insoluble coloring material, the effect of the present invention cannot sufficiently be obtained.

As can be seen from the above, when an ink that contains the water-soluble organic solvent serving as a poor solvent for the water-insoluble coloring material contained in another ink is applied on the recording medium at the portion near the image formed by the another ink containing the water-insoluble coloring material, which has previously been applied, it is preferable for the vapor pressure of the water-soluble organic solvent to be used as a poor solvent to be lower than that of water.

Further, since it is important for the vapor pressure of the water-soluble organic solvent to be used as a poor solvent to be lower than that of water at a controlled temperature, the degree to which the vapor pressure of the water-soluble organic solvent falls below that of water is not especially limited. The temperature used for measuring the vapor pressure is set at a temperature of 20° C., in consideration of the normal use temperature of the ink. However, even at a temperature other than the above, the effect of the present invention can be obtained as long as the measurement temperature falls in a predetermined range of the use temperature of the ink, and the vapor pressure of the water-soluble organic solvent to be used as a poor solvent is lower than that of water at a temperature falling in the predetermined temperature range.

However, for the aqueous ink that contains both a water-insoluble coloring material and a poor solvent for the water-insoluble coloring material, it is possible to use the water-soluble organic solvent (alcohols) having a vapor pressure higher than that of water. This is because when one aqueous ink contains both a water-insoluble coloring material and a poor solvent for the water-insoluble coloring material, the time for an ink containing a water-insoluble coloring material and another ink containing a poor solvent for the water-insoluble coloring material to be mixed with each other is not generated, so the evaporation of the alcohols is not accelerated after the ink has been applied on the recording medium and, therefore, the effect of the poor solvent can sufficiently be obtained.

[Poor Solvent]

The definition of, and selection method for, the poor solvent which is indispensable for developing the mechanism as described above and plays an important role in the present invention will next be described. After various examinations, made in association with the effect of the present invention, about the criterion for the poor solvent that brings about the above effect of the present invention by being contained in an ink, the present inventors found that the following determination method is effective.

Firstly, a dispersion solution of a water-insoluble coloring material containing 50 mass % of a water-soluble organic solvent to be determined, 45 mass % of water, and 5 mass % of a water-insoluble coloring material to be used in the ink were prepared. The prepared dispersion solution was then preserved for 48 hours at 60° C., and the definition was made such that the water-soluble organic solvent in which the average particle size of the water-insoluble coloring material in the dispersion solution is increased relative to the average particle of a water dispersion solution containing 95 mass % of water and 5 mass % of the water-insoluble coloring material is a poor solvent.

To be more precise, the following method is used to determine whether a water-soluble organic solvent to be used becomes a poor solvent for a given water-insoluble coloring material. Firstly, two kinds of dispersion solutions (a dispersion solution A of a given water-insoluble coloring material and water dispersion solution B of the water-insoluble coloring material) containing the water-soluble organic solvent to be determined were prepared.

Dispersion solution A: water-insoluble coloring material dispersion solution containing 50 mass % of a water-soluble organic solvent to be determined, 5 mass % of a water-insoluble coloring material or a total amount of the water-insoluble coloring material and material contributing to the dispersion of the water-insoluble coloring material, and 45 mass % of water.

Water dispersion solution B: water dispersion solution of a water-insoluble coloring material containing 5 mass % of a given water-insoluble coloring material or a total amount of the water-insoluble coloring material and material contributing to the dispersion of the water-insoluble coloring material, and 45 mass % of water.

After the dispersion solution A was preserved for 24 hours at 25° C., the average particle size of the dispersion solution A was measured using a fiber-optics particle analyzer (product name: FPAR-1000; Otsuka Electronics Co., Ltd.) or the like. Further, the average particle size of the water dispersion liquid B was measured in the same manner as described above using the fiber-optics particle analyzer. Here, it is assumed that the average particle sizes of the dispersion solution A and water dispersion solution B are particle size (A) and particle size (B), respectively. When the particle size (A) was larger than the particle size (B), the water-soluble organic solvent was determined as a poor solvent; whereas when the particle size (A) was equal to or smaller than the particle size (B), the water-soluble organic solvent was not determined as a poor solvent.

Specific examples of the water-soluble organic solvent serving as a poor solvent used in the present invention include polyethylene glycol 200 (polyethylene glycol having an average molecular weight of 200), polyethylene glycol 600 (polyethylene glycol having an average molecular weight of 600), 1,5-pentanediol, 2-pyrrolidone, 1,2,6-hexanetriol, and the like. Among them, it is preferable to use polyethylene glycol 600, 1,5-pentanediol, or 2-pyrrolidone. Further, it is more preferable to use polyethylene glycol 600 or 1,5-pentanediol. Of course, the present invention is not limited to the above.

[Relative Permittivity of Water-Soluble Organic Solvent]

The relative permittivity of a water-soluble organic solvent and its measurement method will be described. The relative permittivity $\varepsilon_r$ serving as one factor that determines the polarity of the water-soluble organic solvent is represented by a ratio of the electrostatic capacity $C_x$ of the water-soluble organic solvent to the electrostatic capacity $C_o$ of vacuum and is calculated by the following equation (2).

$$\varepsilon_r = \frac{C_x}{C_o} \qquad \text{(Equation 2)}$$

The water-soluble organic solvent having a large relative permittivity dissolves an ionic material in a stable manner. On the other hand, the water-soluble organic solvent having a small relative permittivity has low capability of dissolving the ionic material. Therefore, as can also be seen from the above-mentioned equation (1), the water-soluble organic solvent having a small relative permittivity strengthens the force acting between ions of the water-insoluble coloring material including an ionic group to compress an electric double layer. As can be seen from this, the water-soluble organic solvent having a small relative permittivity has an effect of allowing the water-insoluble coloring material including an ionic group to become massed together. Therefore, it is important to focus attention on the relative permittivity in selecting the water-soluble organic solvent.

It is possible to easily measure the relative permittivity of a water-soluble organic solvent by using the following method. A sample water-soluble organic solvent is filled in an electrode vessel, and the electrostatic capacity between electrodes is measured at a predetermined frequency. The obtained measurement value of the electrostatic capacity was used to calculate the relative permittivity of the sample water-soluble organic solvent based on the above equation 2. In the present invention, a dielectric constant meter (product name: BI-870; Brookhaven Instruments Corporation) or the like is used to measure the relative permittivity of various water-soluble organic solvents.

Particularly, in the present invention, when the water-soluble organic solvent contained in an ink is selected according to the idea of the present invention, the excellent effect as described above can be obtained. That is, that the relative permittivity $\varepsilon_{s1}$ (relative to the electric constant $\varepsilon_0$) of the water-soluble organic solvent whose content is the highest among the water-soluble organic solvents which are constituent material of the aqueous ink (B) containing a water-insoluble coloring material and the relative permittivity $\varepsilon_{s2}$ (relative to the electric constant $\varepsilon_0$) of the water-soluble organic solvent serving as a poor solvent for the water-insoluble coloring material satisfy $\varepsilon_{s1} > \varepsilon_{s2}$ is preferable for accelerating an aggregation of the water-insoluble coloring material and for obtaining a high-quality image in which occurrence of the bleeding has been suppressed. Further, that the relative permittivity $\varepsilon_{s1}$ of the water-soluble organic solvent whose content is the highest among the water-soluble organic solvents in the aqueous ink (B) containing the water-insoluble coloring material is 35 or less at room temperature (for example, 25° C.) is preferable for accelerating an aggregation of the water-insoluble coloring material and for obtaining a high-quality image in which occurrence of the bleeding has been suppressed.

[Ka Value of Water-Soluble Organic Solvent]

The ka value of a water-soluble organic solvent will be described. The Ka value, which is a scale for representing the permeability of an ink to a recording medium, can be calculated as follows. Firstly, the relation between an ink amount Vr per 1 m square of the recording medium and an amount of permeation V (mL/m²=μm) of an ink into the recording medium after a predetermined time t has elapsed since the ink was ejected is represented by Bristow's equation of the following equation (3).

$$V = V_r + Ka(t - t_w)^{1/2} \qquad \text{(Equation 3)}$$

In the present invention, it is preferable that the water-soluble organic solvent whose Ka value is the highest among the water-soluble organic solvents contained in the respective aqueous inks (a) constituting an ink set serve as a poor solvent for the water-insoluble coloring material. This is because it is considered that in the case where, after an ink containing a water-insoluble coloring material has been applied on a recording-medium, another ink containing a water-soluble organic solvent serving as a poor solvent for the water-insoluble coloring material is applied on the recording medium at the portion near the image formed by the previously applied ink, the following phenomenon is taking place.

At the portion near the outer circumference of the dot formed by the ink containing the water-soluble organic solvent, the density distribution of the water-soluble organic solvent having a high Ka value, that is, high permeability into the recording medium, is increased. It is thus considered that the poor solvent exists with high density at the portion near the outer circumference of the dot of the ink (a) which contains the water-soluble organic solvent serving as the poor solvent and comes into contact with the dot formed by the ink (B) containing the water-insoluble coloring material, and that therefore an aggregation of the water-insoluble coloring material is effectively accelerated. It is therefore preferable in the present invention that the water-soluble organic solvent whose Ka value is the highest among the water-soluble organic solvents contained in the aqueous inks (a) constituting an ink set serve as a poor solvent for the water-insoluble coloring material.

At the time immediately after the ink has been applied on the recording medium, a large part of the ink has been absorbed into the unevenness (surface roughness of the recording medium) on the surface of the recording medium, and has hardly penetrated into the inside (depth direction) of the recording medium. The time between the time at which the ink has been applied into the recording medium and the time at which the ink has been absorbed into the recording medium is referred to as "contact time" ($t_w$), and the ink amount that has been absorbed into the unevenness on the surface of the recording medium during the contact time is the $V_r$. When the time exceeds the contact time after the ink has been applied on the recording medium, an ink amount proportional to the time that has elapsed from the contact time, that is, $(t-t_w)^{1/2}$ penetrates into the inside (depth direction) of the recording medium to increase the amount of permeation.

The above-described Ka is a proportional coefficient for this increase and represents a value corresponding to the permeation rate. It is possible to measure the Ka value using a liquid dynamic permeability tester (product name: dynamic penetrability tester S; Toyo Seiki Seisaku-sho, Ltd.) or the like in accordance with the Bristow's method.

In the present invention, the Ka value in the Bristow method is measured using, as a recording medium, a plain paper (for example, PB paper (available from Canon Inc.) which is recording paper used for copiers and page printers (laser beam printer) of an electrophotographic system and for printers of an ink jet recording system, and PPC paper which is the recording paper for copiers of an electrophotographic system). As the measurement environment, an environment like that in a normal office (for example, a temperature of 20 to 25° C. and a humidity of 40 to 60%) is assumed.

[Aqueous Medium]

It is essential for the respective aqueous inks (a) that constitute the ink set (A) according to the present invention to contain the water-soluble organic solvents serving as a poor solvent for the water-insoluble coloring material contained in the aqueous ink (B) to be used together with the ink set (A). Further, it is possible to appropriately add an aqueous medium containing other water-soluble organic solvent to the respective aqueous inks (a) constituting the ink set according to the present invention as long as the effect can be achieved and the object of the present invention is not impaired due to the addition. The aqueous medium can contain water and water-soluble organic solvent. It is preferable that water to be used not be common water containing various ions but be ion-exchange water (deionized water). Further, it is possible to add a mixture medium, as an aqueous medium, containing water and the following water-soluble organic solvent to the aqueous ink (B) including the water-insoluble coloring material, which is to be used together with the ink set (A).

Specific examples of the water-soluble organic solvent include: alkyl alcohols containing 1 to 4 carbon atoms, such as, methyl alcohol, ethyl alcohol, n-propyl alcohol, isopropyl alcohol, n-butyl alcohol, sec-butyl alcohol, and tert-butyl alcohol; amides, such as dimethyl formamide, and dimethyl acetamide; keton or ketoalcohol, such as acetone and diacetone alcohol; ethers, such as tetrahydrofuran and dioxane; polyalkyleneglycols such as polyethylene glycol, polypropylene glycol; alkylene glycols, such as ethylene glycol, propylene glycol, butylene glycol, triethylene glycol, 1,2,6-hexanetriol, thiodiglycol, hexylene glycol, and diethylene glycol wherein the alkylene group contains 2 to 6 carbon atoms; lower alkylethers of polyalcohol, such as glycerin, ethylene glycol monomethyl or monoethyl ether, diethylene glycol methyl or ethyl ether, triethylene glycol monomethyl or monoethyl ether; N-methyl-2-pyrrolidone, 2-pyrrolidone, 1,3-dimethyl-2-imidazolidinone, and the like. Among them, it is preferable to use polyalcohol such as diethylene glycol, lower alkylethers of polyalcohol such as triethylene glycol monomethyl or monoethyl ether. The above water-soluble organic solvents may be used singly or in combination.

In the present invention, it is preferable to select the water-soluble organic solvents such that the relative permittivity $\in_{s1}$ (relative to the electric constant $\in_0$) of the water-soluble organic solvent whose content is the highest among the water-soluble organic solvents contained in the aqueous ink (B) which is used together with the ink set (A) according to the present invention and contains a water-insoluble coloring material and the relative permittivity $\in_{s2}$ (relative to the electric constant $\in_0$) of the water-soluble organic solvent contained in the respective aqueous ink (a) constituting the ink set (A) and serving as a poor solvent for the water-insoluble coloring material contained in the aqueous ink (B) satisfy $\in_{s1} > \in_{s2}$. In this case, the effect of the present invention can be further exhibited.

Further, in the present invention, it is preferable to select the water-soluble organic solvents such that the relative permittivity $\in_{s1}$ of the water-soluble organic solvent whose content is the highest among the water-soluble organic solvents contained in the aqueous ink (B) containing the water-insoluble coloring material is 35 or less, more preferably, 30 or less. In this case, the effect of the present invention can be further exhibited.

Further, in the present invention, it is preferable that the water-soluble organic solvent whose content is the highest among the water-soluble organic solvents contained in the respective aqueous inks (a) that constitute the ink set serve as a poor solvent for the water-insoluble coloring material contained in the aqueous ink (B). In this case, the effect of the present invention can be further exhibited.

Further, in the present invention, it is preferable that the total (mass %) of the content of the water-soluble organic solvents, which are contained in the respective aqueous inks (a) constituting the ink set to serve as a poor solvent for the water-insoluble coloring material, be at least twice or more, more preferably three times or more, the content (mass %) of the water-insoluble coloring material in the aqueous ink (B). In this case, the effect of the present invention can be further exhibited. It is preferable that the upper limit of the ratio of the total (mass %) of the content of the water-soluble organic solvents to the content (mass %) of the water-insoluble coloring material in the aqueous ink (B) be 20-fold or less. The examination made by the present inventors revealed that even when the amount of the respective aqueous inks (a) to be applied on the recording medium is less than the amount of the aqueous ink (B) to be applied on the recording medium, it is possible to obtain a high-quality image in which occurrence of the bleeding has been suppressed, which is the effect of the present invention, as long as the above ratio is more than twice or more. This means that even when the amount of the water-soluble organic solvent serving as a poor solvent to be applied on the recording medium is less than the amount of the water-insoluble coloring material to be applied on the recording medium, the abovementioned image formation mechanism is developed as long as the above mass ratio is twice or more.

In the present invention, if it is expected that even when a water-insoluble coloring material and a water-soluble organic solvent serving as a poor solvent for the water-insoluble coloring material are contained in the same aqueous ink, it is possible to obtain a high-quality image in which occurrence of the bleeding has been suppressed to the same level as or further than in the case where they are contained in two different inks.

The content of the water-soluble organic solvent in the respective aqueous inks (a) constituting the ink set according to the present invention or in the aqueous ink (B) to be used together with the ink set according to the present invention is assumed to be in the range of from 3 mass % to 50 mass %, more preferably, in the range of from 3 mass % to 40 mass % with respect to the total mass of the ink. The content of water is assumed to be in the range of from 10 mass % to 90 mass %, more preferably, in the range of from 30 mass % to 80 mass % with respect to a total mass of the ink. In particular, it is preferable that the total amount of the water-soluble organic solvent in the aqueous ink (a) serve as a poor solvent for the water-insoluble coloring material in the aqueous ink (B). In this case, the effect of the present invention can be further exhibited. It is preferable that the content of the water-soluble organic solvent serving as a poor solvent be in the range of from 4 mass % to 50 mass %, more preferably, in the range of from 4 mass % to 40 mass % with respect to the total mass of the ink.

[Water-Insoluble Coloring Material]

The water-insoluble coloring material which is a coloring material (B) of the aqueous ink to be used together with the ink set according to the present invention will next be described. The water-insoluble coloring material to be used in the present invention is not especially limited, and it is possible to use pigments such as a carbon black or an organic pigment. In particular, it is preferable to use a pigment in which at least one ionic group is bonded to the surface thereof directly or through another atomic group. As long as the above condition is satisfied, the pigment to be used in the present invention is not especially limited, and it is possible to use a pigment obtained by bonding a compound having the ionic group to the surface thereof using a diazo coupling method, a pigment obtained by introducing the ionic group to the surface thereof through surface oxidizing treatment such as one using sodium hypochlorite or aqueous ozone, and a pigment to the surface of which a dispersing agent, a surface active agent, and a resin dispersing agent which have the ionic group are absorbed. These water-insoluble coloring materials may be used singly or in mixture of two or more thereof.

Among them, preferably used is a pigment in which at least one selected from a group consisting of —COOM1, —SO$_3$M1, and —PO$_3$H (M1)$_2$ (M1 in the chemical formula represents hydrogen atom, alkali metal, ammonium, or organic ammonium) is chemically bonded to the surface thereof directly or through another atomic group by using a diazo coupling method. Further, it is preferable that that other atomic group be an alkylene group containing 1 to 12 carbon atoms, a substituted or unsubstituted phenylene group, or a substituted or unsubstituted naphthylene group.

To be more specific, it is possible to preferably use a self-dispersing pigment in which a hydrophilic group such as —C$_6$H$_4$—COOM1 group, or —C$_6$H$_3$—(COOM1)$_2$ group (M1 in the chemical formula represents hydrogen atom, alkali metal, ammonium, or organic ammonium), is introduced to the surface thereof. Among them, when the self-dispersing pigment in which —C$_6$H$_3$—(COOM1)$_2$ group is introduced is used, a satisfactory effect is exhibited in the configuration of present invention.

The more the amount of the above hydrophilic group such as —C$_6$H$_4$—COOM1 group, or —C$_6$H$_3$—(COOM1)$_2$ group to be introduced to the pigment surface per unit surface area of a pigment particle, the more favorable the effect that is exhibited in the configuration of the present invention. It can be considered that this fact is prominently involved in the interaction between the self-dispersing pigment and the water-soluble organic solvent contained in the ink. That is, when the self-dispersing pigment in which a hydrophilic group such as —C$_6$H$_4$—COOM1 group, or —C$_6$H$_3$—(COOM1)$_2$ group is bonded to the surface thereof directly or through another atomic group, in particular, when the —C$_6$H$_4$—COOM1 group has been bonded to the surface of the pigment in higher density, the water-soluble organic solvent contained in the ink becomes harder to blend in the pigment due to influence of steric hindrance or the like, as compared to the case of a conventional self-dispersing pigment. Therefore, at the time when the ink is applied on the recording medium, a separation (solid-liquid separation) between the water-soluble organic solvent contained in the ink and solid content containing the pigment takes place in an extremely quick manner. Further, when the water-soluble organic solvent contained in the ink becomes harder to blend in the pigment, the effect of decentralized stabilization becomes small, so that an aggregation between pigments on the recording medium takes place more prominently.

(Pigment)

The pigment that can be used in the aqueous ink (B) used in the present invention is not especially limited, and it is possible to use the following pigments. It is preferable that the content of the pigment be in the range of from 1 mass % to 20 mass %, more preferably, in the range of from 2 mass % to 12 mass % with respect to the total mass of the ink.

It is preferable to use a carbon black as a pigment used for a black ink. Specific examples of the carbon black include: furnace black, lamp black, acetylene black, channel black, and the like. To be more specific, the following commercial items can be used: Raven 7000, Raven 5750, Raven 5250, Raven 5000 ULTRA, Raven 3500, Raven 2000, Raven 1500, Raven 1250, Raven 1200, Raven 1190 ULTRA-II, Raven 1170, Raven 1255 (available from Colombia Co., Ltd.); Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, Monarch 2000, Valcan XC-72R (available from Cabot Corp.); Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A, Special Black 4 (available from Degussa); No. 25, No. 33, No. 40, No. 47, No. 52, No. 900, No. 2300, MCF-88, MA600, MA7, MA8, MA100 (available from Mitsubishi Chemical Corporation or the like). In addition, it is possible to use a carbon black newly prepared for the present invention. However, the pigment for the black ink used in the present invention is not limited to the above, and any of the known carbon blacks can be used. Further, magnetic particles such as magnetite and ferrite and titanium black can be used as the black pigment, in addition to the carbon black.

Specific examples of the pigment for color inks will be shown below according to color. Examples of the pigment for a yellow ink include: C.I. Pigment Yellow: 1, 2, 3, 13, 16, 74, 83, 128 and the like. Examples of the pigment for a magenta ink include: C.I. Pigment Red: 5, 7, 12, 48 (Ca), 48 (Mn), 57 (Ca), 112, and 122. Examples of the pigment for a cyan ink include: C.I. Pigment Blue: 1, 2, 3, 15: 3, 16, 22, C.I. Vat Blue: 4, 6 and the like. However, the pigments for these color inks used in the present invention are not limited to the above, and it is possible to use pigments newly prepared for the present invention, in addition to the abovementioned pigments.

When a pigment is used as a water-insoluble coloring material, it is possible to use a dispersant for allowing the pigment to be dispersed in the ink. It is possible to use any dispersant as long as it is water-soluble resin. For the water-soluble resin, the weight average molecular weight is preferably 1,000 to 30,000, more preferably 3,000 to 15,000.

Examples of such a dispersant include a block copolymer, a random copolymer, a graft copolymer and a salt comprising at least two monomers (at least one of which is a hydrophilic monomer) selected from styrene, a styrene derivative, vinylnaphthalene, a vinylnaphthalene derivative, an aliphatic alcohol ester of an α,β-ethylenic unsaturated carboxylic acid, an acrylic acid, an acrylic acid derivative, maleic acid, a maleic acid derivative, itaconic acid, an itaconic acid derivative, fumaric acid, a fumaric acid derivative, vinyl acetate, vinylpyrrolidone, acrylamide and an acrylamide derivative. In addition, a natural resin, such as rosin, shellac or starch, can also be used as a dispersant. The above-described resins are soluble in an aqueous solution in which a base is dissolved, and alkali-soluble resins. It is preferable that the content of such a water-soluble resin employed as a dispersant be in the range of from 0.1 mass % to 5 mass %, with respect to the total mass of the ink.

(Oil-Soluble Dye)

An oil-soluble dye is not especially limited as long as it is selected from Color Index. Further, it is possible to use a new dye that is not described in Color Index. Specific examples of the oil-soluble dye are as follows. It is preferable that the content of such an oil-soluble dye be in the range of from 1 mass % to 10 mass %, more preferably in the range of from 1 mass % to 5 mass %, with respect to the total mass of the ink.

Specific examples of the oil-soluble dye will be shown below according to color. Examples of the oil-soluble dye for a yellow ink include: C.I. Solvent Yellow: 1, 49, 62, 74, 79, 82, 83, 89, 90, 120, 121, 151, 153, 154 and the like. Examples of the oil-soluble dye for a magenta ink include: C.I. Solvent Red: 25, 31, 86, 92, 97, 118, 132, 160, 186, 187, 219 and the like. Examples of the oil-soluble dye for a cyan ink include: C.I. Solvent Blue: 33, 38, 42, 45, 53, 65, 67, 70, 104, 114, 115, 135 and the like.

[Water-Soluble Coloring Material]

Although the water-insoluble coloring material can be used in preparing the respective aqueous inks (a) constituting the ink set (A) according to the present invention, the following water-soluble coloring materials can also be used singly or together with the water-insoluble coloring material. A plurality of water-soluble coloring materials can be used at the same time. A water-soluble dye can be taken as an example of the water-soluble coloring material and, in particular, it is preferable to use anionic group as a solubilizing group. Also, when the aqueous ink (B) containing the water-insoluble coloring material to be used together with the ink set (A) is prepared, the following water-soluble coloring materials can be used together with the water-insoluble coloring material.

(Dye)

A dye used in the present invention is not especially limited as long as it is selected from a water-soluble acid dye, a direct dye, or a reactive dye described in Color Index. Further, it is possible to use other dyes that are not described in Color Index, as long as the dye has an anionic group such as a sulfone group. It is preferable that the content of a dye used in the present invention be in the range of from 1 mass % to 10 mass %, more preferably in the range of from 1 mass % to 5 mass %, with respect to the total mass of the ink. In particular, it is preferable to use a dye having a carboxyl group as a solubilizing group. In this case, an image excellent in water resistance can be obtained when the ink is applied on the recording medium.

Specific examples of the dye will be shown according to color.

C.I. Direct Yellow: 8, 11, 12, 27, 28, 33, 39, 44, 50, 58, 85, 86, 87, 88, 98, 100, 110, 132 and the like;

C.I. Direct Red: 2, 4, 9, 11, 20, 23, 24, 31, 39, 46, 62, 75, 79, 80, 83, 89, 95, 197, 201, 218, 220, 224, 225, 226, 227, 228, 230 and the like;

C.I. Direct Blue: 1, 15, 22, 25, 41, 76, 77, 80, 86, 90, 98, 106, 108, 120, 158, 163, 168, 199, 226 and the like;

C.I. Acid Yellow: 1, 3, 7, 11, 17, 23, 25, 29, 36, 38, 40, 42, 44, 76, 98, 99 and the like;

C.I. Acid Red: 6, 8, 9, 13, 14, 18, 26, 27, 32, 35, 42, 51, 52, 80, 83, 87, 89, 92, 94, 106, 114, 115, 133, 134, 145, 158, 198, 249, 265, 289 and the like;

C.I. Acid Blue: 1, 7, 9, 15, 22, 23, 25, 29, 40, 43, 59, 62, 74, 78, 80, 90, 100, 102, 104, 117, 127, 138, 158, 161 and the like.

[Characteristics of Ink]

It is preferable that the respective aqueous inks (a) that constitute the ink set (A) according to the present invention and aqueous ink (B) which contains the water-insoluble coloring material and is used together with the ink set (A) have properties of being ejected from an ink jet recording head favorably. In view of ejectability of ink from the ink jet recording head, it is preferable that the ink has viscosity of 1 to 15 mPa·s and surface tension of 25 mN/m or more, more preferably, viscosity of 1 to 5 Pa·s and surface tension of 25 to 50 mN/m. When the black ink and color ink are used at the same time, it is preferable that the surface tension of the color ink be lower than the surface tension of the black ink. To be more specific, it is preferable that the surface tension of the black ink is between 35 and 50 mN/m and the surface tension of the color ink is between 25 and 35 mN/m.

[Other Components]

It is possible to add, as an ink component, moisture components such as urea, urea derivative, trimethylolpropane, and trimethylolethane to the respective aqueous inks (a) that constitute the ink set (A) according to the present invention and aqueous ink (B) which contains the water-insoluble coloring material and is used together with the ink set (A) in addition to the above components in order to maintain moisture level. It is preferable that the contents of the moisture components such as urea, urea derivative, trimethylolpropane, and the like in the ink be in the range of from 0.1 mass % to 20.0 mass %, more preferably, in the range of from 3.0 mass % to 10.0 mass %, with respect to the total mass of the ink.

Further, it is possible to add, according to need, various additives such as a surface active agent, pH adjuster, anti-rust agent, antiseptic agent, antifungal agent, oxidation inhibitor, reduction inhibitor, evaporation accelerator, and chelating agent to the respective aqueous inks (a) that constitute the ink set (A) according to the present invention and aqueous ink (B) which contains the water-insoluble coloring material and is used together with the ink set (A) in addition to the above components.

[Image Formation Method]

Hereinafter, an image formation method according to the present invention will be described. In the image formation method according to the present invention, the ink set (A) obtained by combining a plurality of aqueous inks (a) containing the water-soluble organic solvent serving as a poor solvent for the above mentioned water-insoluble coloring material and aqueous ink (B) which contains the water-insoluble coloring material are used together. At the time of forming an image on a recording medium using these inks, an applying of the aqueous ink (B) containing the water-insoluble coloring material is performed to form an image, and another applying of at least one of the plurality of aqueous inks (a) that constitute the ink set (A) is performed for the area where the image has been formed, thereby forming an image in which different color regions are situated adjacently to one another.

In the image formation method according to the present invention, it is preferable to use the aqueous ink (B) containing the water-insoluble coloring material as a black ink and the respective aqueous inks (a) which contain the water-soluble organic solvents serving as a poor solvent for the water-insoluble coloring material contained in the aqueous ink (B) and constitute the ink set (A) obtained by combining a plurality of aqueous inks as color inks. In this case, the excellent effect as described above can be obtained. The reason is as follows.

The occurrence of the bleeding is more noticeable in a black ink than in a color ink. When the color ink contains the water-soluble organic solvent serving as a poor solvent for the water-insoluble coloring material contained in the black ink at the time of forming an image in which images formed by the respective aqueous inks (a) that constitute the ink set (A) are situated adjacently to one another, it is possible to accelerate an aggregation of the water-insoluble coloring material on the surface of the recording medium or in the inside thereof, thereby suppressing the dispersion of the water-insoluble coloring material in the inside of the recording medium. That is, with the above configuration, it is possible for the water-insoluble coloring material contained in the black ink to be quickly fixed on the recording medium, whereby a high-quality image in which occurrence of the bleeding has been suppressed is obtained.

Figure 16:
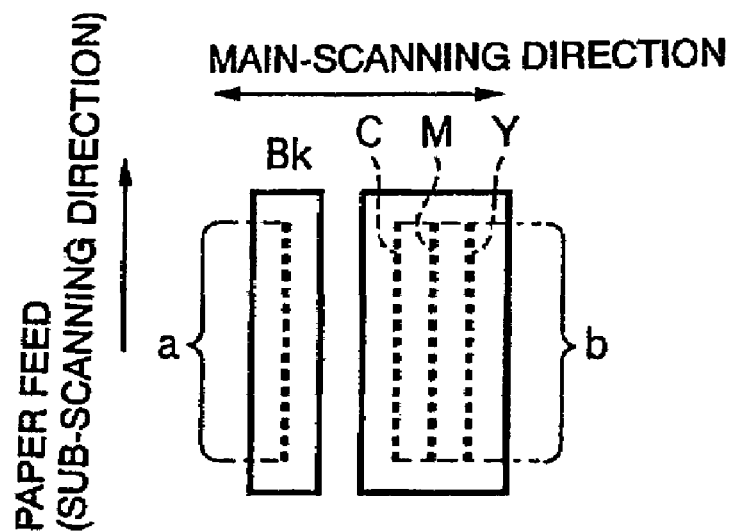
FIG. 16 is a view showing an example of a configuration of the recording head.
Figure 17:
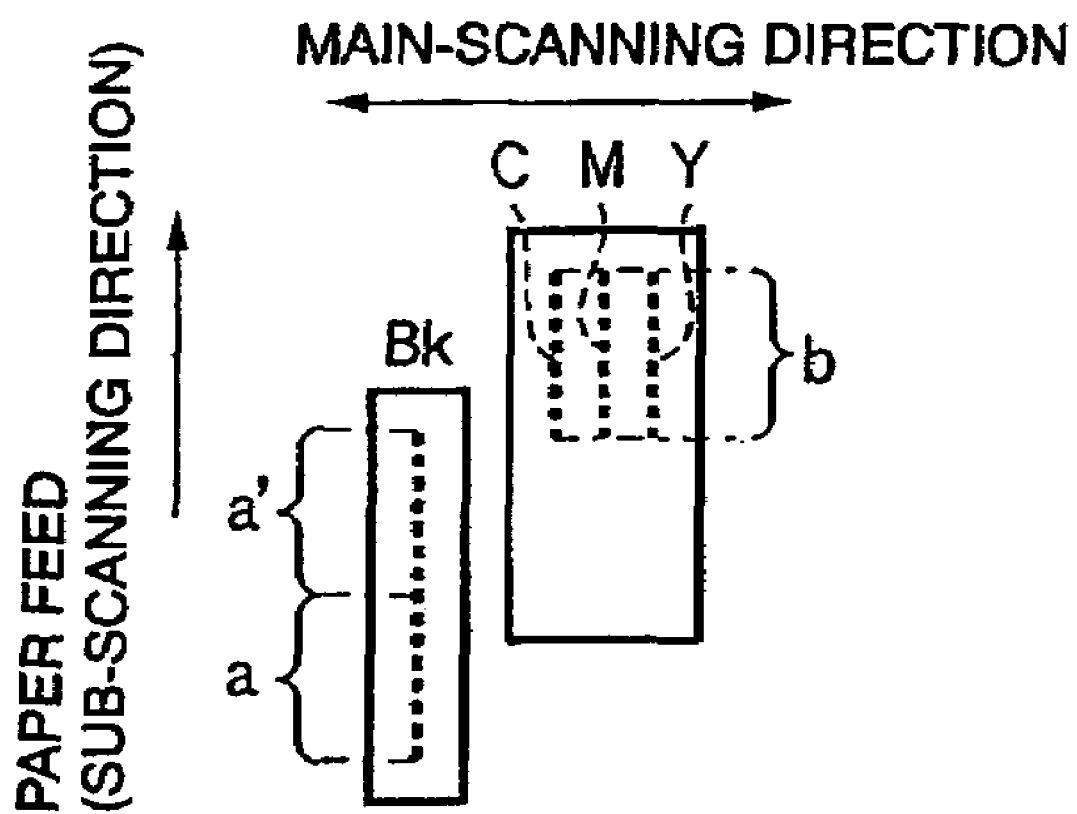
FIG. 17 is a view showing an example of a configuration of the recording head.

Hereinafter, the image formation method according to the present invention will be described with the case where the aqueous ink (B) containing the water-insoluble coloring material is a black ink and the respective aqueous inks (a) containing the water-soluble organic solvents serving as a poor solvent for the water-insoluble coloring material are color inks as an example. The recording head shown in FIGS. 10 to 15 is a recording head in which a black ink ejection port train and color ink ejection port trains are mounted on one head chip. The recording head shown in FIGS. 16 and 17 is a recording head in which a head chip on which a black ink ejection port train is mounted and a head chip on which color ink ejection port trains are mounted are separately provided.

When a full-color image is to be formed in the image formation method according to the present invention, it is preferable to use a recording head in which a black ink ejection port train for ejecting a black ink and color ink ejection port trains are not aligned with each other in the sub-scanning direction. To be more specific, when, for example, a full-color image in which a black ink and color inks exist together is formed using the recording head shown in FIG. 10, it is preferable for the black ink to be ejected from a portion indicated by "a" of the black ink ejection port train and for the color inks including C, M, and Y to be ejected from a portion indicated by "b" of the color ink ejection port trains. Details of the image formation process of forming an image in which a black ink and color inks exist together will be described below.

Figure 10:
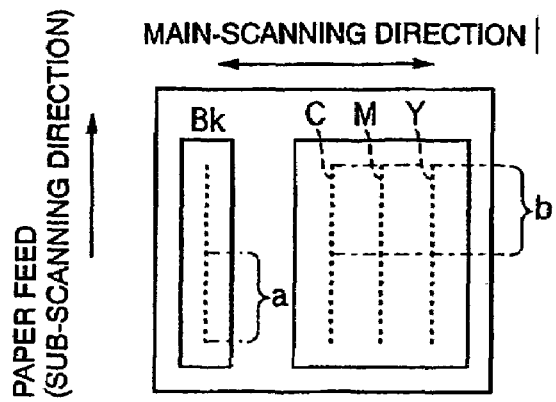
FIG. 10 is a view showing an example of a configuration of the recording head.

FIG. 10 shows an example of a recording head that can be used in the present invention. The recording head is provided with an ejection port train (Bk) for ejecting a black ink and ejection port trains for ejecting three color inks of cyan (C), magenta (M), and yellow (Y), respectively. Firstly, the print head is moved to the lateral direction (main-scanning direction) in the drawing with the portion "a" of the black ink ejection port train used, to form a black image on the recording medium in one-pass printing. The recording medium is then fed by a distance of "a" in the sub-scanning direction. Next, during the process of the next movement of the print head in the forward direction of the main scanning, the portion "b" of the color ink ejection port trains is used to form a color image on the image area that has been formed using the portion "a" of the black ink ejection port train in one-pass printing. At this time, the portion "a" of the black ink ejection port train is forming an image in the next area. The repeat of the above process allows an image in which a black ink image and color ink image exist together to be formed on the recording medium.

Figure 11:
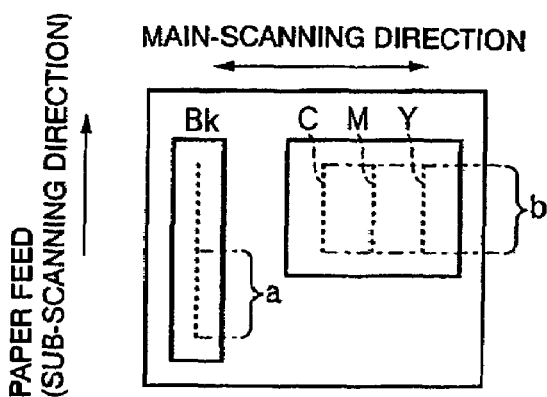
FIG. 11 is a view showing an example of a configuration of the recording head.

FIG. 11 shows another example of the recording head that can be used in the present invention. Also in this case, like the recording head shown in FIG. 10, the black ink is ejected from a portion indicated by "a" of the black ink ejection port train and the color inks including C, M, and Y are ejected from a portion indicated by "b" of the color ink ejection port trains to form an image in which a black ink image and color ink image exist together in the same manner as described above.

Figure 12:
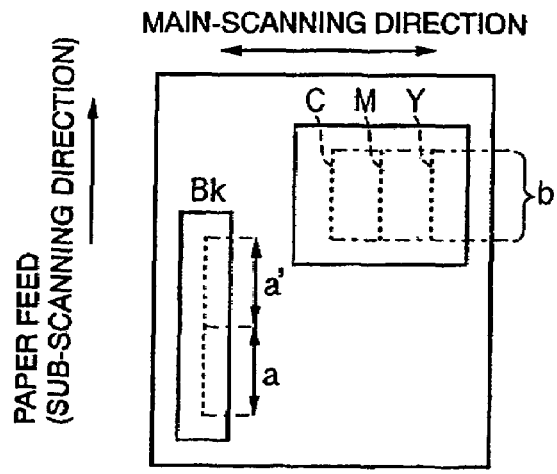
FIG. 12 is a view showing an example of a configuration of the recording head.

FIG. 12 shows still another example of the recording head that can be used in the present invention. Also in this case, like the recording head shown in FIG. 10, the black ink is ejected from a portion indicated by "a" of the black ink ejection port train and the color inks including C, M, and Y are ejected from a portion indicated by "b" of the color ink ejection port trains to form an image in which a black ink image and color ink image exist together. In the recording head shown in FIG. 12, the portion "a" of the black ink ejection port train and the portion "b" of the color ink ejection port trains are spaced apart from each other by a distance of "a'" corresponding to one paper feed amount. Therefore, in the recording head having such a configuration, extra time interval corresponding to one scanning operation (round trip) is caused between the time when the black ink image is formed and the time when the color ink image is formed. Therefore, the configuration of the recording head shown in FIG. 12 is more advantageous for the suppression of the bleeding occurring between the black ink image and color ink image than the configuration of the recording head shown in FIG. 11.

Figure 13:
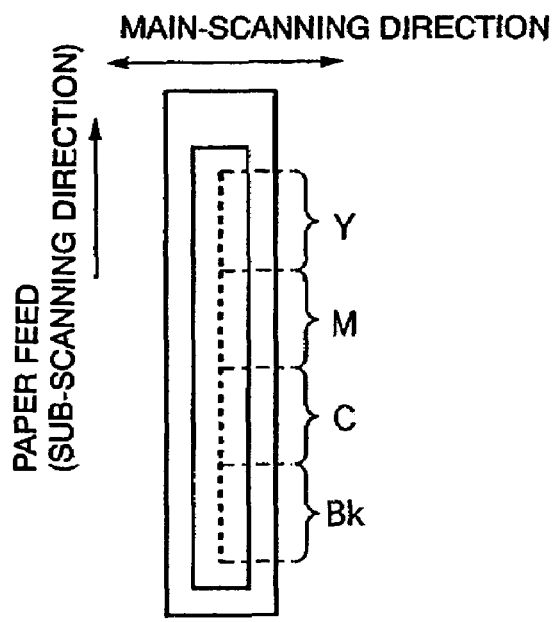
FIG. 13 is a view showing an example of a configuration of the recording head.

FIG. 13 shows still another example of the recording head that can be used in the present invention. In the recording head shown in FIG. 13, the black ink ejection port train and color ink ejection port trains are arranged in a line in the sub-scanning direction. When the recording head having the above configuration is used, a color ink image is formed after a black ink image has been formed according to paper feed.

Figure 14:
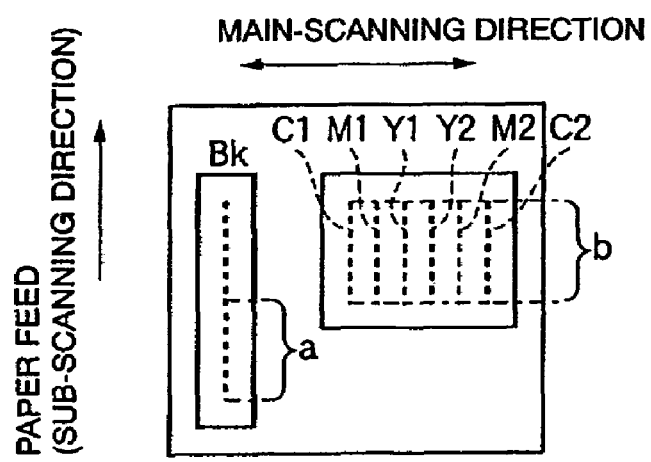
FIG. 14 is a view showing an example of a configuration of the recording head.
Figure 15:
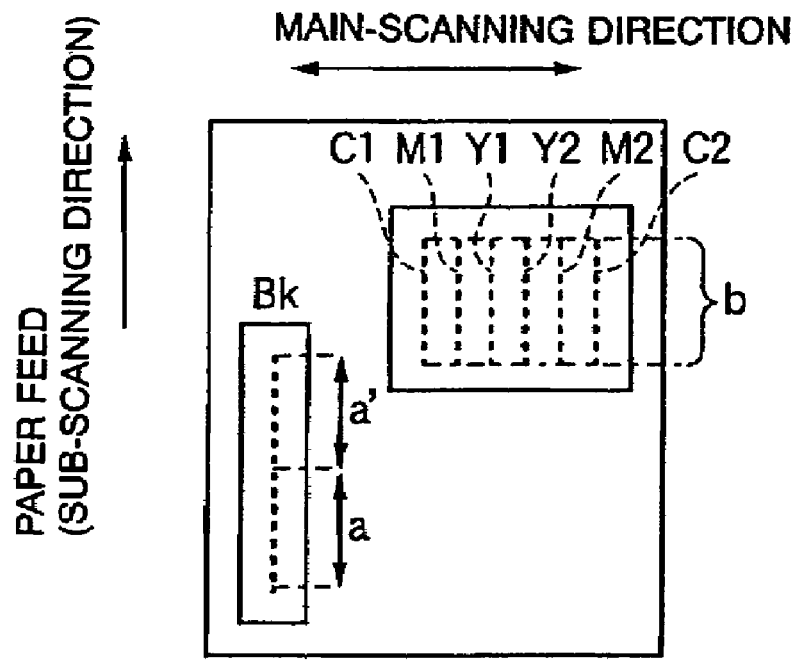
FIG. 15 is a view showing an example of a configuration of the recording head.

FIG. 14 shows still another example of the recording head that can be used in the present invention. In the recording head shown in FIG. 14, two color ink ejection port trains are provided respectively for cyan ink (C1, C2), magenta ink (M1, M2), yellow ink (Y1,Y2) and a first group (C1, M1,Y1) and a second group (Y2, M2. C2) are symmetrically arranged with respect to the main-scanning direction so as to make the applying order of the color inks equal between forward direction and backward direction in the main scanning operation. As a result, in the image formation operation of forming an image in which a black ink image and color ink image exist together, bi-directional printing can be performed. In this case, firstly the portion "a" of the black ink ejection port train is used to form a black ink image, the recording medium is then fed by a distance of "a" in the sub-scanning direction, and during the process of the next movement of the print head in the backward direction of the main scanning, the portion "b" of the color ink ejection port trains is used to form a color image on the image area that has been formed using the portion "a" of the black ink ejection port train in one-pass printing.

The same configuration as that of the recording head shown in FIG. 12 is possible in the recording head of FIG. 14 that can perform bi-directional printing. That is, the portion "a" of the black ink ejection port train and the portion "b" of the color ink ejection port trains are spaced apart from each other by a distance of "a'" corresponding to one paper feed amount (see FIG. 15), and extra time interval corresponding to one scanning operation (round trip) is provided between the time when the black ink image is formed and the time when the color ink image is formed. With this configuration, the configuration of the recording head shown in FIG. 14 becomes more advantageous for the suppression of the bleeding occurring between the black ink image and color ink image.

FIG. 16 shows still another example of the recording head that can be used in the present invention. The recording head shown in FIG. 16 is a recording head with an ink tank, in which a recording head with ink tank for black ink and a recording head with ink tank for color inks can be separately attached to a carriage. As in the case of FIG. 12, in the recording head shown in FIG. 16, the black ink is ejected from a portion indicated by "a" of the black ink ejection port train and the color inks including C, M, and Y are ejected from a portion indicated by "b" of the color ink ejection port trains to form an image in which a black ink image and color ink image exist together.

FIG. 17 shows still another example of the recording head that can be used in the present invention. Like the recording head shown in FIG. 16, the recording head of FIG. 17 is a recording head with an ink tank in which a recording head with ink tank for black ink and a recording head with ink tank for color inks can be separately attached to a carriage. In the recording of FIG. 17, the black ink is ejected from a portion indicated by "a" of the black ink ejection port train and the color inks including C, M, and Y are ejected from a portion indicated by "b" which covers the entire area of the color ink ejection port trains to form an image in which a black ink image and color ink image exist together. Further, in the recording head shown in FIG. 17, the portion "a" of the black ink ejection port train and the portion "b" of the color ink ejection port trains are spaced apart from each other by a distance of "a'" corresponding to one paper feed amount. Therefore, in the recording head having such a configuration, extra time interval corresponding to one scanning operation (round trip) is caused between the time when the black ink image is formed and the time when the color ink image is formed. Therefore, the configuration of the recording head shown in FIG. 17 is more advantageous for the suppression of the bleeding occurring between the black ink image and color ink image than the configuration of the recording head shown in FIG. 16.

While the image formation method according to the present invention has been described, it should be apparent that the configuration of the recording head that can be used in the image formation method according to the present invention is not limited to those shown in FIGS. 10 to 17.

[Ink-Jet Recording Method, Ink Cartridge, Recording Unit, and Ink Jet Recording Apparatus]

An example of an ink jet recording apparatus according to the present invention will next be described. The ink jet recording apparatus is characterized by comprising the abovementioned ink set according to the present invention.

Figure 2:
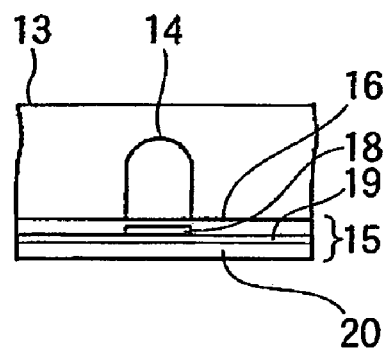
FIG. 2 is a vertical cross-sectional view of the recording head taken along the line 2-2 of FIG. 1.

An example of a configuration of a head, which is the main part of the ink jet recording apparatus that utilizes heat energy, is shown in FIGS. 1 and 2. FIG. 1 is a vertical cross-sectional view of a recording head 13 taken along an ink path, and FIG. 2 is a vertical cross-sectional view of the recording head 13 taken along the line 2-2 of FIG. 1. The recording head 13 is obtained by bonding glass, ceramic, silicone, plastic plate, or the like having an ink path (nozzle) 14 to a heating element substrate 15.

The heating element substrate 15 includes a protection layer 16 formed by silicon oxide, silicon nitride, silicon carbide, and the like, electrodes 17-1 and 17-2 formed by aluminium, gold, aluminum-copper alloy and the like, a heating resistor element layer 18 formed by a high melting point material such as $HfB_2$, TaN, TaAl, and the like, a heat accumulation layer 19 formed by thermal oxidized silicon, aluminum oxide, and the like, and a substrate 20 formed by a material having enhanced heat dissipation properties, such as silicone, aluminium, and aluminum nitride.

When a pulse electrical signal is applied to the electrodes 17-1 and 17-2 of the recording head 13, the area indicated by "n" in the heating element substrate 15 is rapidly heated to produce bubbles in an ink 21 which is in contact with the surface of the area. The pressure caused by the bubbles allows a meniscus 23 to project to cause the ink 21 to be ejected through the nozzle 14 of the head. The ink 21 ejected from the orifice 22 forms an ink droplet 24 which flies toward a recording medium 25.

Figure 3:
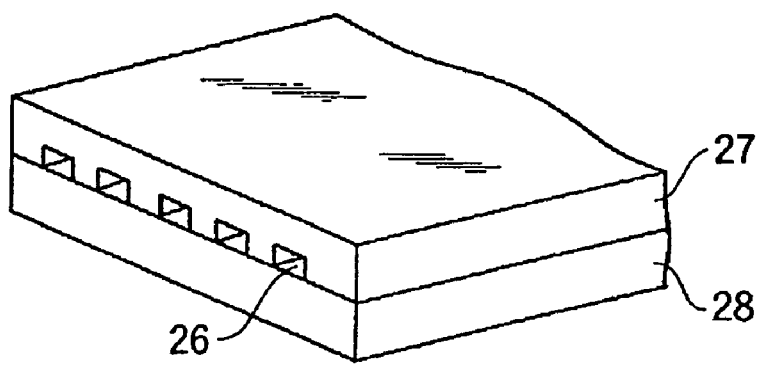
FIG. 3 is a perspective view of a recording head obtained by arranging a plurality of the recording head of FIG. 1.

FIG. 3 is a schematic view of a multi-recording head in which a large number of recording heads shown in FIG. 1 are arranged. The recording head is manufactured by closely adhering a heating head 28, which is the same as that described in connection with FIG. 1, to a glass plate 27 having a multi-nozzle 26.

Figure 4:
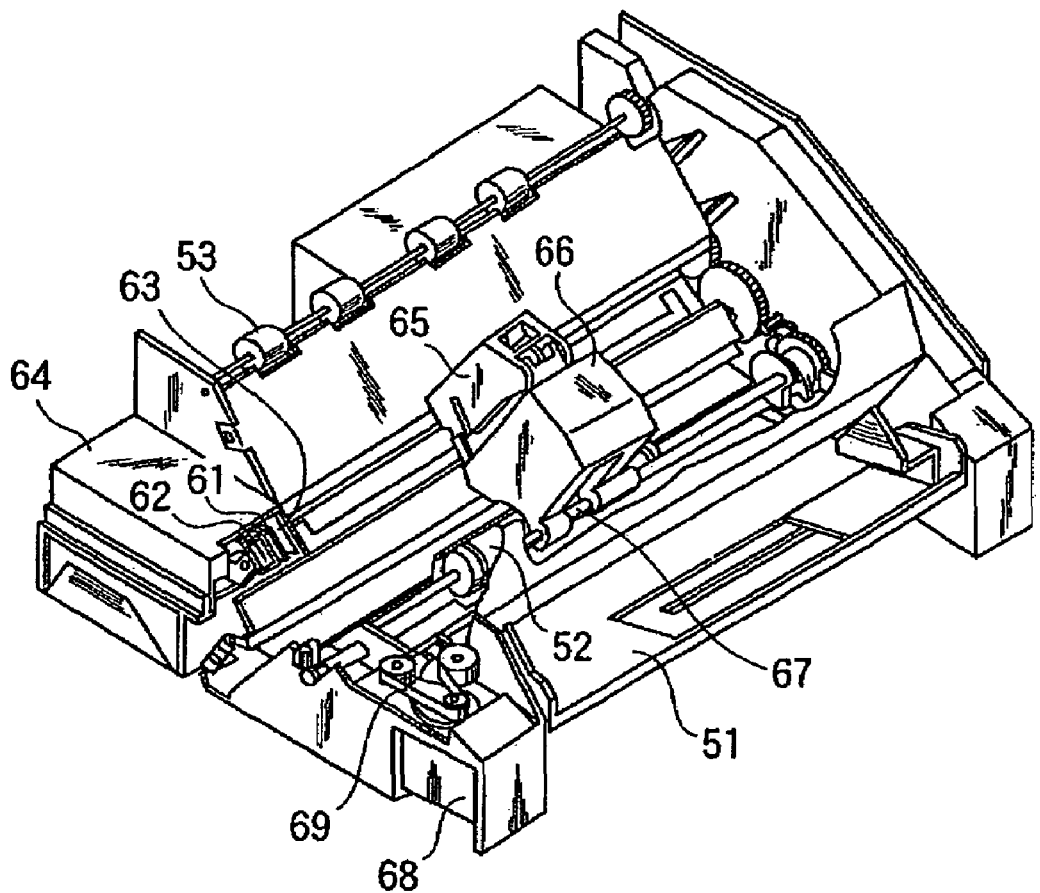
FIG. 4 is a perspective view showing an example of an ink jet recording apparatus.

FIG. 4 shows an example of an ink jet recording apparatus in which the head is assembled. In FIG. 4, reference numeral 61 denotes a blade serving as a wiping member. One end of the blade 61 is a fixed end held by a blade holding member. The blade 61 is shaped as a cantilever. The blade 61 is disposed at a position that adjoins the recording area formed by the recording head 65. Further, in the configuration shown in the drawing, the blade 61 is held in such a manner as to protrude into the path in which the recording head 65 is moved.

Reference numeral 62 is a cap of the ejection port surface of the recording head 65. The cap 62 is disposed at a home position adjacent to the blade 61 and is movable in the direction perpendicular to the direction in which the recording head 65 is moved to contact an ejection port surface for capping. Reference numeral 63 is an ink absorbing member provided adjacent to the blade 61. Like the blade 61, the absorbing member 63 protrudes into the path in which the recording head 65 is moved. The blade 61, the cap 62 and the absorber 63 constitute an ejection recovering portion 64. The blade 61 and the absorber 63 remove the water contents or dust on the ink ejection port surface.

Reference numeral 65 is a recording head having an ejection energy generation means to eject ink to a recording medium that opposes the ejection port surface on which the ejection ports are arrayed for recording. Reference numeral 66 is a carriage carrying the recording head 65 thereon and moving the recording head 65. The carriage 66 slidably engages with a guide shaft 67. A part of the carriage 66 is connected (not shown) to a belt 69 driven by a motor 68. Accordingly, the carriage 66 can be moved along the guide shaft 67 and consequently the recording head 65 can be moved in the recording area and the area adjacent to the recording area.

Reference numeral 51 is a paper-feeding portion used for inserting the recording medium. Reference numeral 52 is a paper feed roller driven by a motor (not shown). This structure allows the recording medium to be fed to a position where the recording medium opposes the discharge port surface of the recording head 65. As recording proceeds, the recording paper is discharged to a paper discharge portion in which a paper discharge roller 53 is disposed. When the recording head 65 returns to a home position after recording is completed, the ejection port surface of the recording head 65 is wiped because the cap 62 of the ejection recovering portion 64 is at a retracted position from the path along which the recording head 65 is moved while the blade 61 is protruding into that path.

When the cap 62 comes into contact with the ejection port surface of the recording head 65 for capping it, the cap 62 moves in such a manner that it protrudes into the path along which the recording head is moved. When the recording head 65 moves from the home position to a recording starting position, the cap 62 and the blade 61 are at the same positions as those where they are located when the above-described wiping operation is conducted, and the ejection port surface of the recording head 65 is thus wiped. Movement of the recording head to the home position occurs not only when recording is completed or for the ejection recovery operation, but also at predetermined time intervals during the movement of the recording head for recording in the recording area. Each time the recording head 65 is moved to the home position, wiping is conducted.

Figure 5:
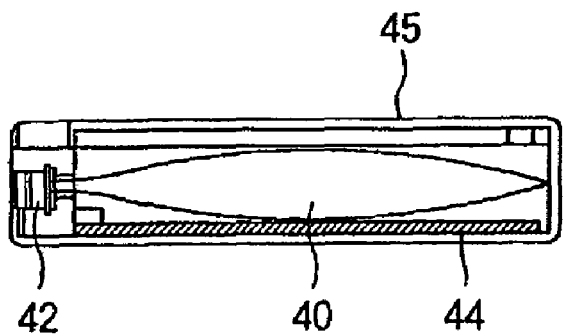
FIG. 5 is a vertical view of an ink cartridge.

FIG. 5 shows an example of an ink cartridge in which ink to be supplied to the recording head through an ink supply member, e.g., a tube, is accommodated. Reference numeral 40 is an ink accommodating portion accommodating an ink to be supplied to the head. The ink accommodating portion 40 may be an ink bag. A rubber plug 42 is provided at the distal end of the ink bag. Supply of the ink in the ink bag 40 is enabled by inserting a needle (not shown) into the plug 42. Reference numeral 44 is an ink absorber receiving ink waste. A desirable ink accommodating portion is of the type in which the ink-contacting surface is made of polyolefin, particularly, polyethylene.

Figure 6:
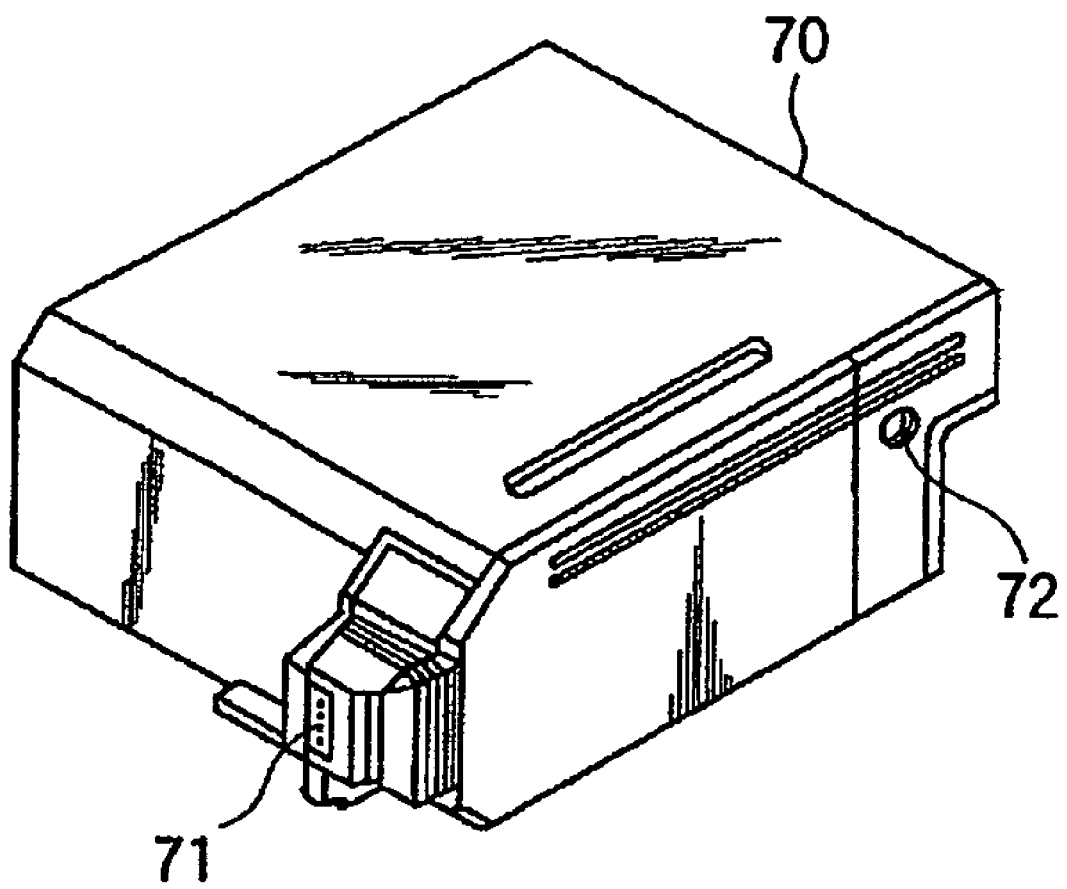
FIG. 6 is a perspective view showing an example of a recording unit.

Not only the above-described ink jet recording apparatus in which the head and the ink cartridge are provided separately but also an ink jet recording apparatus in which the head and the ink cartridge are formed as one unit, as shown in FIG. 6, can be used in the present invention. In FIG. 6, reference numeral 70 is a recording unit including an ink accommodating portion for accommodating ink, e.g., an absorbing member. The ink in such an absorbing member is ejected as ink droplets from a head portion 71 having a plurality of orifices. It is preferable in the present invention that the absorbing member is made of polyurethane. Further, in place of the configuration using the absorbing member, the ink accommodating portion can be configured as an ink bag in which a spring or the like is provided. The interior of the cartridge communicates with the air through an air port 72. The recording unit 70 can replace the recording head 65 shown in FIG. 4. The recording unit 70 can be mounted on and removed from the carriage 66.

Figure 7:
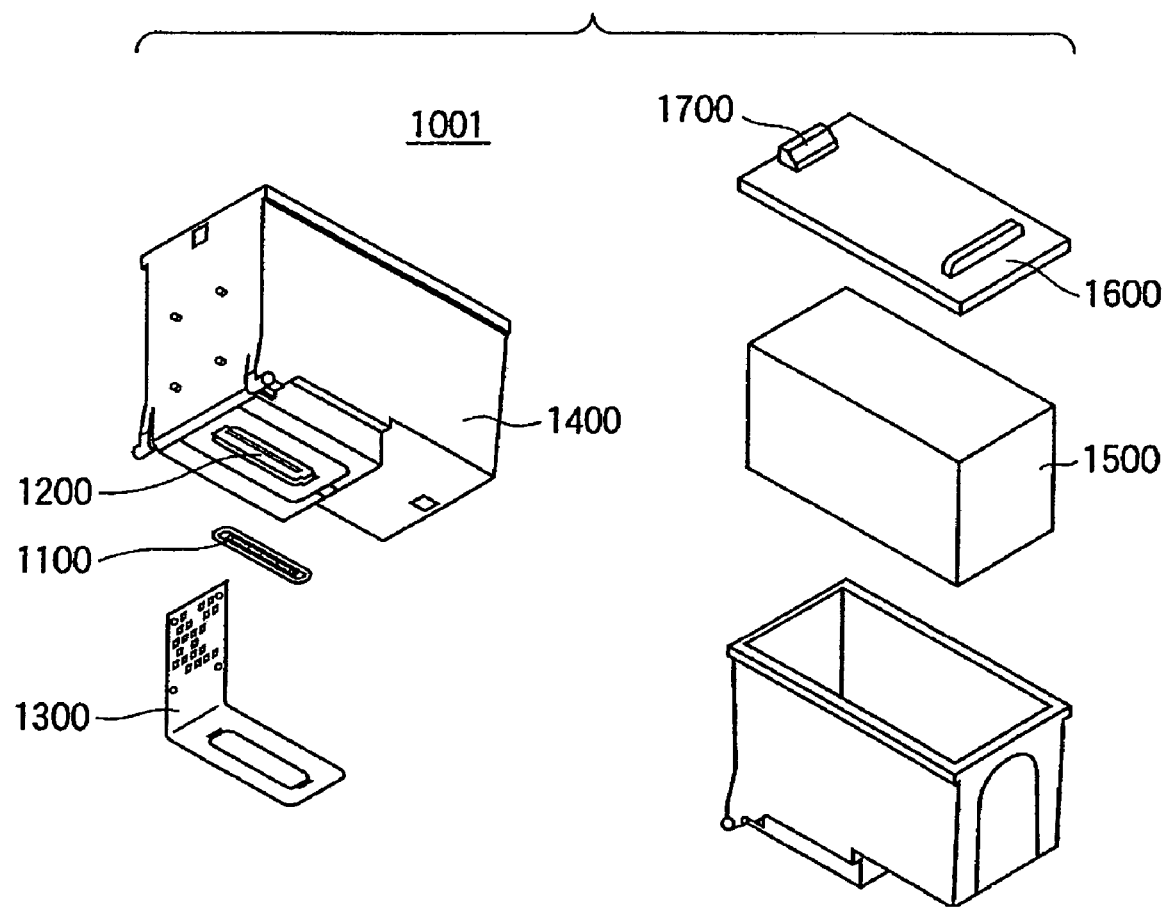
FIG. 7 is an exploded view of the recording head.

FIG. 7 is an exploded view of the recording head that can be used in the present invention. The recording head shown in FIG. 7 is formed integrally with an ink tank. A recording head 1001 is supported and fixed by a positioning means of a carriage placed on the ink jet recording apparatus and electrical contact point. The recording head 1001 is detachably attached to the carriage and is exchanged for a new one when the inks have been used up.

The recording head 1001 is used for ejecting an ink and includes a recording element substrate 1100 on which ink supply ports are aligned, an electrical wiring tape 1300 used for forming an electrical signal path to which an electrical signal for ejecting an ink is applied, an ink supply support member 1400 formed by resin molding, an absorbing member 1500 which generates negative pressure for holding an ink, and a cap member 1600.

The ink supply support member 1400 has a space for holding the absorber 1500 for generating negative pressure for holding inks of cyan, magenta, and yellow, thereby serving as an ink tank. Further, the ink supply support member 1400 forms an independent ink path for guiding an ink to the ink supply port of the recording element substrate 1100, thereby serving as an ink supplier. The ink supply support member 1400 has an ink supply port 1200 for supplying an ink to the recording element substrate 1100 at the downstream portion of the ink path. The recoding element substrate 1100 is fixed to the ink supply support member 1400 such that the ink supply port of the recoding element substrate 1100 communicates with the ink supply port 1200 of the ink supply support member 1400. The back surface of a part of the electrical wiring tape 1300 is fixed to the plain surface around the ink supply port 1200. The cap member 1600 is welded to the upper opening of the ink supply support member 1400 to cover the interior space of the ink supply support member 1400. The cap member 1600 has an engagement portion 1700 for fixing the recording head to the ink jet recording apparatus.

Figure 8:
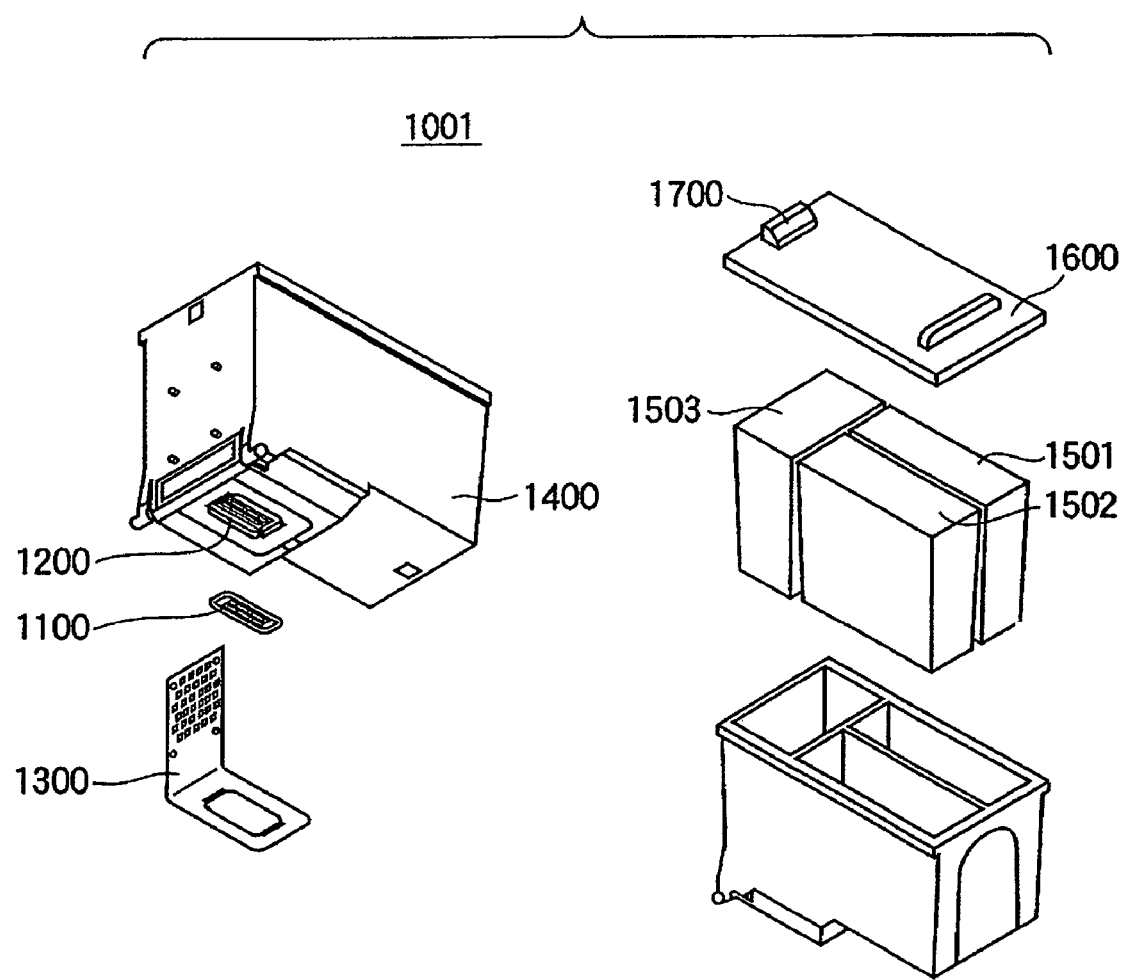
FIG. 8 is an exploded view of the recording head.

FIG. 8 is an exploded view of another example the recording head that can be used in the present invention. Like the recording head shown in FIG. 7, the recording head shown in FIG. 8 is formed integrally with an ink tank. The recording head 1001 can carry a plurality of different color inks (for example, cyan ink, magenta ink, yellow ink) and is exchanged for a new one when the carried inks have been used up.

The recording head 1001 is used for ejecting a plurality of different color inks (for example, cyan ink, magenta ink, yellow ink) and includes a recording element substrate 1100 on which ink supply ports for cyan, magenta, yellow inks are aligned, and the like. The ink supply support member 1400 has a space for holding absorbers 1501, 1502, and 1503 for generating negative pressure for independently holding inks of cyan, magenta, and yellow, thereby serving as an ink tank. Further, the ink supply support member 1400 forms independent ink paths for guiding respective inks to the ink supply port of the recording element substrate 1100, thereby serving as an ink supplier.

It is preferable in the present invention that the surface areas of the parts at which respective liquid chambers are exposed to air be made equal between them, as shown in FIG. 8. With this configuration, it is possible to make the evaporation amount of the respective inks stored in the liquid chambers equal to some degree.

Figure 9:
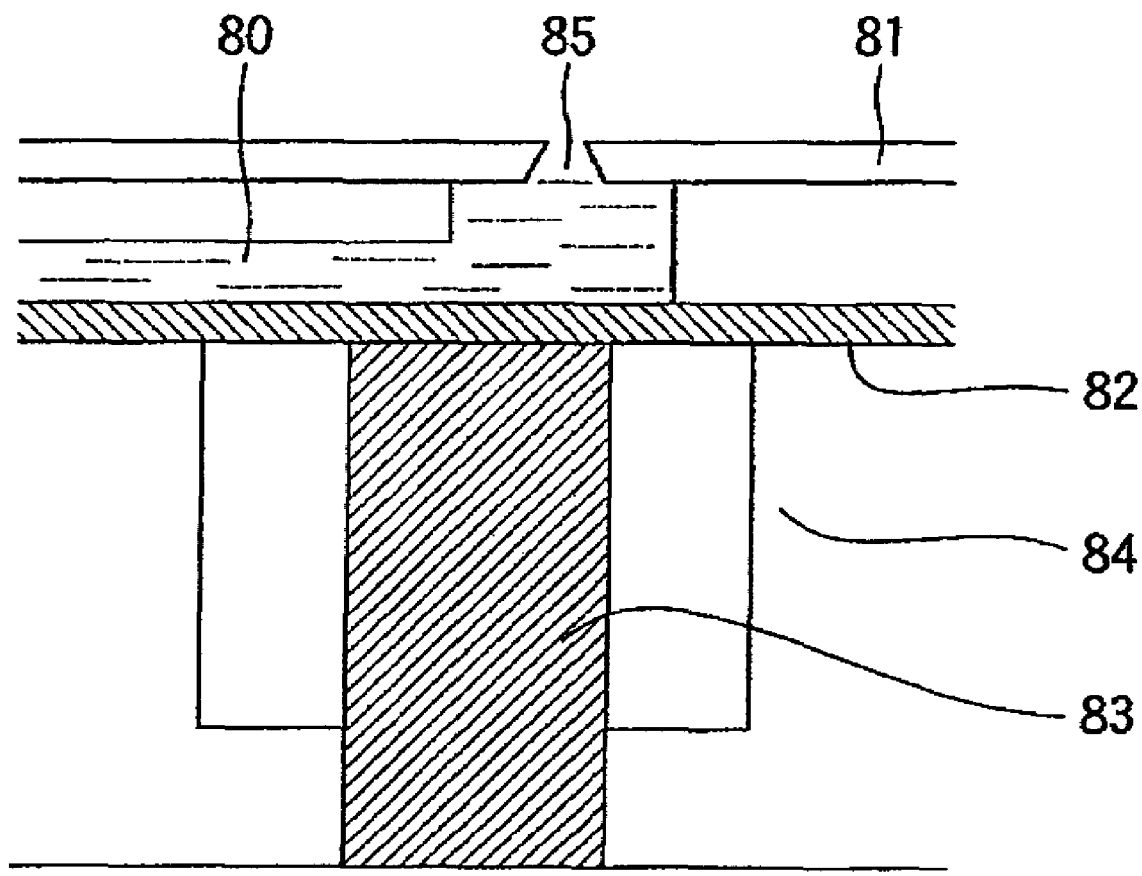
FIG. 9 is a view showing an example of a configuration of the recording head.

A preferred example of the ink jet recording apparatus that utilizes mechanical energy will next be described. An on-demand ink jet recording head can be taken as an example of the ink jet recording apparatus utilizing mechanical energy. The on-demand ink jet recording head includes a nozzle substrate having a plurality of nozzles, a pressure generation element including a piezoelectric material and conductive material and disposed opposite to the nozzles and an ink that fills the area around the pressure generation element to thereby displace the pressure generation element by applied voltage to eject ink droplets from the nozzles can be taken. An example of the configuration of the recording head which is the main part of the recording apparatus is shown in FIG. 9.

The head includes an ink path 80 that communicates with an ink chamber (not shown), an orifice plate 81 for ejecting a desired volume of ink droplets, a vibrating plate 82 allowing pressure to directly act on the ink, a piezoelectric element 83 attached to the vibrating plate 82 and is displaced by an electrical signal, and a substrate 84 for supporting and fixing the orifice plate 81 and vibrating plate 82 and the like.

The ink path 80 is made of photosensitive resin in FIG. 10. The orifice plate 81 is made of metal such as stainless or nickel, through which an ejection port 85 is formed by electrotyping or press working. The vibrating plate 82 is made of metal film such as stainless film, nickel film, or titanium film, high elasticity resin film, and the like. The piezoelectric element 83 is made of a dielectric material such as barium titanate or PZT. The recording head having the above configuration applies a pulse voltage to the piezoelectric element 83 to generate distortion stress. The energy of the distortion stress deforms the vibrating plate attached to the piezoelectric element 83 to apply pressure perpendicularly to the ink in the ink path 80. As a result, ink droplets (not shown) are ejected from the ejection port 85 of the orifice plate 81 and are printed on the recording medium. Such a recording head is incorporated in the ink jet recording apparatus having the same configuration as that shown in FIG. 4 at the time of use. The ink jet recording apparatus can be operated in the same manner as described above without problem.

EXAMPLES

The present invention will now be described in more detail by way of examples and reference examples. The present invention is not limited to the following examples unless it exceeds the scope of the present invention. All "parts" and "%" hereinafter referred to are in mass terms unless otherwise stated.

[Preparation of Pigment Dispersion Solution A]

1.5 g of 4-aminophthalic acid was added at 5° C. to a solution of 5 g of concentrated hydrochloric acid dissolved in 5.5 g of water. This solution was stirred in an iced bath to be always maintained at 10° C. or less and a solution of 1.8 g of sodium nitrite dissolved in 9 g of 5° C. water was added to this solution. After the resulting solution was further stirred for 15 minutes, 6 g of carbon black having a specific surface area of 220 $m^2/g$ and a DBP oil absorption of 105 mL/100 g was added and mixed. Thereafter, the solution was stirred for another 15 minutes. The obtained slurry was filtered with a paper filter (product name: standard filter paper No. 2 manufactured by Advantec), and pigment particles were thoroughly washed with water and dried in an oven heated at 110° C. to prepare self-dispersion carbon black A.

Water was added to the obtained self-dispersion carbon black A to prepare a dispersion solution having a pigment concentration of 10 mass %. With the above process, a pigment dispersion solution A in which the self-dispersion carbon black A having —$C_6H_3$—$(COONa)_2$ group introduced to the surface of carbon black is dispersed in water was obtained. In the pigment dispersion solution A, the carbon black was dispersed in water in a favorable state even without the use of dispersant.

The ionic group density of the prepared self-dispersion carbon black A (pigment A) was measured, and it was 3.1 $\mu mol/m^2$. In the measurement of the ionic group density, ion meter (product of DKK-Toa corporation) was used to measure the sodium ion concentration in the above pigment dispersion solution A, and the obtained result is converted into the ionic group density of the self-dispersion carbon black A.

[Determination on Whether Respective Water-Soluble Organic Solvents Serve as Poor Solvent for Pigment A]

The following test was conducted in order to select the water-soluble organic solvent that acts as a poor solvent for the pigment in the above pigment dispersion solution. Firstly, the pigment dispersion solution A having a solid content concentration of 10% was used to prepare an aqueous solution. This aqueous solution and respective water-soluble organic solvents were used to prepare poor solvent-determination dispersion solution A and poor solvent-determination water dispersion solution B according to the following compounding ratios.

(Compounding Ratio of Poor Solvent-Determination Dispersion Solution s)

[Determination Dispersion Solution A]
pigment dispersion solution A 5 parts
respective water-soluble organic solvents listed in Table 1 50 parts
pure water 45 parts

[Determination Water Dispersion Solution B]
pigment dispersion solution A 5 parts
pure water 95 parts (Determination Method)

Next, 10 g of the respective determination dispersion solution A and determination water dispersion solution B prepared in the manner as described above were placed in transparent glass sample bottles with caps, respectively. The sample bottles were covered with the caps and sufficiently stirred, followed by settling for 48 hours at 60° C. After that, as measurement samples, the average particle sizes of the pigments in the settled dispersion solutions were measured using a fiber-optics particle analyzer (product name: FPAR-1000; Otsuka Electronics Co., Ltd.). When the average particle size of the pigments in the determination dispersion solution A was larger than the average particle size of the pigments in the determination water dispersion solution B, the water-soluble organic solvent contained in the determination dispersion solution A at that time was determined as a poor solvent; whereas when the average particle size of the pigments in the determination dispersion solution A was equal to or smaller than the average particle size of the pigments in the determination water dispersion solution B, the water-soluble organic solvent contained in the determination dispersion solution A at that time was not determined as a poor solvent.

Table 1 shows results of the determination on whether the respective water-soluble organic solvents serve as a poor solvent or not, which are obtained by measuring the average particle size in the manner as described above. In Table 1, the case where an increase in the particle size was found and the relevant water-soluble organic solvent was determined as a poor solvent was indicated by "o" and the case where an increase in the particle size was not found and the relevant water-soluble organic solvent was not determined as a poor solvent was indicated by "x".

TABLE 1

|  | Determination |
| --- | --- |
| Polyethylene glycol 600 | o |
| Isopropyl alcohol | o |
| Polyethylene glycol 200 | o |
| 1,5-pentanediol | o |
| 2-pyrrolidone | o |
| Ethylene glycol | x |
| Glycerin | x |

[Measurement of Relative Permittivity of Water-Soluble Organic Solvents]

A dielectric constant meter (product name: BI-870; Brookhaven Instruments Corporation) was used to measure the relative permittivity of water-soluble organic solvents listed in Table 1. Firstly, 23 ml of the water-soluble organic solvent to be measured was placed in a cell and the relative permittivity was measured at a frequency of 10 kHz with the electrodes dipped in the sample solution. The measurement results of the relative permittivity of the respective water-soluble organic solvents are shown in Table 2.

TABLE 2

| water-soluble organic solvent | Relative permittivity (20~25° C.) |
| --- | --- |
| Polyethylene glycol 600 | 11.6 |
| Isopropyl alcohol | 18.3 |
| Polyethylene glycol 200 | 19.2 |
| 1,5-pentanediol | 27.0 |
| 2-pyrrolidone | 27.4 |
| Ethylene glycol | 37.7 |
| Glycerin | 42.5 |

[Vapor Pressure of Water-Soluble Organic Solvent]

The vapor pressures of the respective water-soluble organic solvents to be used for the ink are shown in Table 3.

TABLE 3

| Water-soluble organic solvent | Vapor pressure (20° C.)[mmHg] |
|---|---|
| Polyethylene glycol 600 | <0.01 |
| Isopropyl alcohol | 32.3 |
| Polyethylene glycol 200 | <0.01 |
| 1,5-pentanediol | <0.01 |
| 2-pyrrolidone | <0.01 |
| Ethylene glycol | <0.1 |
| Glycerin | <0.001 |
| Pure water | 17.5 |

[Preparation of Ink Sets for Examples 1 to 20 and Reference Examples 1 to 10]

The prepared pigment dispersion solution A was used and the components listed in Table 4 were mixed, stirred sufficiently, followed by dissolution or dispersion. After that, the resultant mixture was subjected to pressure filtration using a 1.2 μm microfilter (product of Fuji Photo Film Co., Ltd.) to prepare black inks 1 to 3.

TABLE 4

| | Black ink | | |
|---|---|---|---|
| | 1 | 2 | 3 |
| Pigment dispersion solution A | 45.0 | 45.0 | 45.0 |
| Polyethylene glycol 200 | 15.0 | | |
| 1,5-pentanediol | | 15.0 | |
| | | | 15.0 |
| Acetylenol EH*1 | 0.1 | 0.1 | 0.1 |
| Pure water | 39.9 | 39.9 | 39.9 |

*1 acetylene glycol ethylene oxide adduct
(surfactant, product of Kawaken Fine Chemicals Co., Ltd).

Color ink sets A to M to be used together with the above black inks 1 to 3 were obtained. The components listed in Tables 5, 6, and 7 were mixed and stirred sufficiently, followed by dissolution. The resultant mixture was subjected to pressure filtration using a microfilter (product of Fuji Photo Film Co., Ltd.) having a pore size of 0.2 μm to prepare color inks of Y, M, C, respectively to obtain color ink sets A to M.

TABLE 5

| | Color ink set | | | | | | | | | | | | | | |
|---|---|---|---|---|---|---|---|---|---|---|---|---|---|---|---|
| | A | | | B | | | C | | | D | | | E | | |
| | C | M | Y | C | M | Y | C | M | Y | C | M | Y | C | M | Y |
| C.I. Direct Blue 199 | 3.5 | | | 3.5 | | | 3.5 | | | 3.5 | | | 3.5 | | |
| C.I. Acid Red 289 | | 2.5 | | | 2.5 | | | 2.5 | | | 2.5 | | | 2.5 | |
| C.I. Direct Yellow 132 | | | 2.5 | | | 2.5 | | | 2.5 | | | 2.5 | | | 2.5 |
| Polyethylene glycol 600 | 15.0 | 15.0 | 15.0 | | | | | | | | | | | | |
| 1,5-pentanediol | | | | 15.0 | | | | 15.0 | | | | 15.0 | 15.0 | 15.0 | 15.0 |
| 2-pyrrolidone | | | | | 15.0 | 15.0 | 15.0 | | 15.0 | 15.0 | 15.0 | | | | |
| Ethylene glycol | | | | | | | | | | | | | | | |
| Glycerin | | | | | | | | | | | | | | | |
| Isopropyl alcohol | | | | | | | | | | | | | | | |
| Acetylenol EH*1 | 0.7 | 0.7 | 0.7 | 0.7 | 0.7 | 0.7 | 0.7 | 0.7 | 0.7 | 0.7 | 0.7 | 0.7 | 0.7 | 0.7 | 0.7 |
| Pure water | 80.8 | 81.8 | 81.8 | 80.8 | 81.8 | 81.8 | 80.8 | 81.8 | 81.8 | 80.8 | 81.8 | 81.8 | 80.8 | 81.8 | 81.8 |

(*1) acetylene glycol ethylene oxide adduct
(surfactant, product of Kawaken Fine Chemicals Co., Ltd).

TABLE 6

| | Color ink set | | | | | | | | | | | |
|---|---|---|---|---|---|---|---|---|---|---|---|---|
| | F | | | G | | | H | | | I | | |
| | C | M | Y | C | M | Y | C | M | Y | C | M | Y |
| C.I. Direct Blue 99 | 3.5 | | | 3.5 | | | 3.5 | | | 3.5 | | |
| C.I. Acid Red 289 | | 2.5 | | | 2.5 | | | 2.5 | | | 2.5 | |
| C.I. Direct Yellow 132 | | | 2.5 | | | 2.5 | | | 2.5 | | | 2.5 |
| Polyethylene glycol 600 | | | | | | | | | | | | |
| 1,5-pentanediol | | | | | | | | | | | | |
| 2-pyrrolidone | 15.0 | 15.0 | 15.0 | 8.0 | 8.0 | 8.0 | | | | | | |
| Ethylene glycol | | | | | | | 15.0 | 15.0 | 15.0 | | | |
| Glycerin | | | | 2.5 | 2.5 | 2.5 | | | | 15.0 | 15.0 | 15.0 |

TABLE 6-continued

| | Color ink set | | | | | | | | | | | |
|---|---|---|---|---|---|---|---|---|---|---|---|---|
| | F | | | G | | | H | | | I | | |
| | C | M | Y | C | M | Y | C | M | Y | C | M | Y |
| Isopropyl alcohol | | | | | | | | | | | | |
| Acetylenol EH1 | 0.7 | 0.7 | 0.7 | 0.7 | 0.7 | 0.7 | 0.7 | 0.7 | 0.7 | 0.7 | 0.7 | 0.7 |
| Pure water | 80.8 | 81.8 | 81.8 | 85.3 | 86.3 | 86.3 | 80.8 | 81.8 | 81.8 | 80.8 | 81.8 | 81.8 |

(*1) acetylene glycol ethylene oxide adduct
surfactant product of Kawaken Fine Chemicals Co., Ltd).

The Ka value of 2-pyrrolidone (20 mass % aqueous solution) was 0.19 (mL/m$^2$/msec$^{1/2}$), and the Ka value of glycerin (20 wt. % aqueous solution) was 0.13 (mL/m$^2$/msec$^{1/2}$).

TABLE 7

| | Color ink set | | | | | | | | | | | |
|---|---|---|---|---|---|---|---|---|---|---|---|---|
| | J | | | K | | | L | | | M | | |
| | C | M | Y | C | M | Y | C | M | Y | C | M | Y |
| C.I. Direct Blue 199 | 3.5 | | | 3.5 | | | 3.5 | | | 3.5 | | |
| C.I. Acid Red 289 | | 2.5 | | | 2.5 | | | 2.5 | | | 2.5 | |
| C.I. Direct Yellow 132 | | | 2.5 | | | 2.5 | | | 2.5 | | | 2.5 |
| Polyethylene glycol 600 | | | | | | | | | | | | |
| 1,5-pentanediol | | | | | | | | | | | | |
| 2-pyrrolidone | | 15.0 | 15.0 | 15.0 | | 15.0 | 15.0 | 15.0 | | | | |
| Ethylene glycol | 15.0 | | | | 15.0 | | | | 15.0 | | | |
| Glycerin | | | | | | | | | | | | |
| Isopropyl alcohol | | | | | | | | | | 15.0 | 15.0 | 15.0 |
| Acetylenol EH1 | 0.7 | 0.7 | 0.7 | 0.7 | 0.7 | 0.7 | 0.7 | 0.7 | 0.7 | 0.7 | 0.7 | 0.7 |
| Pure water | 80.8 | 81.8 | 81.8 | 80.8 | 81.8 | 81.8 | 80.8 | 81.8 | 81.8 | 80.8 | 81.8 | 81.8 |

(*1) acetylene glycol ethylene oxide adduct
surfactant product of Kawaken Fine Chemicals Co., Ltd).

Examples 1 to 20 and Reference Examples 1 to 10

The above black inks 1 to 3 and color ink sets A to M are combined, and image formation was performed with the respective combinations mounted on the ink jet recording apparatus having the recording head shown in Table 8. In examples 1 to 20, the relation between the black ink and color ink set satisfies the requirement of claim 1. In reference examples 1 to 6, respective inks that constitute the color ink set do not contain a poor solvent. In reference examples 7 to 9, one of the three inks that constitute the ink set does not contain a poor solvent. In reference example 10, although respective inks that constitute the color ink set contain a poor solvent, the vapor pressure of the poor solvent at 20° C. is higher than the vapor pressure of water at 20° C.

TABLE 8

| | | Black ink | Color ink set | Recording head |
|---|---|---|---|---|
| Example | 1 | 1 | A | FIG. 11 |
| | 2 | 2 | A | FIG. 11 |
| | 3 | 3 | A | FIG. 11 |
| | 4 | 1 | A | FIG. 12 |
| | 5 | 2 | A | FIG. 12 |
| | 6 | 3 | A | FIG. 12 |
| | 7 | 1 | A | FIG. 17 |
| | 8 | 2 | A | FIG. 17 |
| | 9 | 3 | A | FIG. 17 |
| | 10 | 1 | B | FIG. 12 |
| | 11 | 1 | C | FIG. 12 |
| | 12 | 1 | D | FIG. 12 |
| | 13 | 1 | E | FIG. 12 |
| | 14 | 1 | F | FIG. 12 |
| | 15 | 1 | B | FIG. 17 |
| | 16 | 1 | C | FIG. 17 |
| | 17 | 1 | D | FIG. 17 |
| | 18 | 1 | E | FIG. 17 |
| | 19 | 1 | F | FIG. 17 |
| | 20 | 3 | G | FIG. 17 |
| Reference examples | 1 | 1 | H | FIG. 12 |
| | 2 | 2 | H | FIG. 12 |
| | 3 | 3 | H | FIG. 12 |
| | 4 | 1 | I | FIG. 12 |
| | 5 | 2 | I | FIG. 12 |
| | 6 | 3 | I | FIG. 12 |
| | 7 | 1 | J | FIG. 12 |
| | 8 | 1 | K | FIG. 12 |
| | 9 | 1 | L | FIG. 12 |
| | 10 | 1 | M | FIG. 12 |

[Evaluation]

The black inks and color ink sets of the examples and the reference examples shown in Table 8 were used to form images and evaluation of the bleeding was made. As a recording apparatus, ink jet recording apparatuses (BJS 600 and BJS 700, products of Canon Inc.) having an on-demand type multi-recording head that applies heat energy to an ink according to a recording signal to eject the ink were used. The respective recording heads of the apparatus were modified into the configurations shown in FIGS. 11, 12 and 17, as shown in Table 8. As a recording medium, Super White Paper SW-101 (product of Canon Inc.) was used. The recording heads shown in FIGS. 11, 12, and 17 were used to form images, respectively, in which a black ink solid image and a color (yellow, magenta, cyan) solid image were situated adjacent to each other. The degree of the bleeding at the boundary between the black ink image and color ink image was observed with eyes and evaluated using the following criteria. The evaluation results are shown in Table 9.

AA: Further improved as compared to reference examples (bleeding cannot be visually confirmed)

A: Improved as compared to reference example (bleeding is hardly noticeable)

B: Equivalent level to reference example (bleeding occurs, but can be ignored)

TABLE 9

| .. | .. | Bleeding evaluation result |
|---|---|---|
| Example | 1 | A•• |
|  | 2 | A•• |
|  | 3 | A•• |
|  | 4 | AA•• |
|  | 5 | AA•• |
|  | 6 | AA•• |
|  | 7 | AA•• |
|  | 8 | AA•• |
|  | 9 | AA•• |
|  | 10 | A•• |
|  | 11 | A•• |
|  | 12 | A•• |
|  | 13 | A•• |
|  | 14 | A•• |
|  | 15 | A•• |
|  | 16 | A•• |
|  | 17 | A•• |
|  | 18 | A•• |
|  | 19 | A•• |
|  | 20 | A•• |

In Table 9, the quality of images of examples 1 to 3 and 10 to 19, which were rated "A", were higher than that of image of example 20, which was also rated "A". In particular, the present invention aims to suppress the occurrence of the bleeding at the entire boundary area between the black image formed by a black ink containing a pigment and color image formed by color inks used together with the black ink. All the evaluations of the examples in which the ink set according to the present invention is used to form the image were higher than those of reference examples, thus proving the advantage of the present invention.

The present invention is applicable to an ink set capable of providing a high-quality image in which occurrence of the bleeding at the boundaries between different color regions in the case where a full-color image in which the respective color regions are situated adjacently to one another is formed.

Further, the present invention is applicable to an ink jet recording method capable of forming a high-quality image in which occurrence of the bleeding has been suppressed by using the ink set and an ink cartridge, recording unit, and ink jet recording apparatus suitably used in the above recording method.

Further, the present invention is applicable to an image formation method capable of effectively suppressing occurrence of the bleeding at the boundaries between different color-regions in the case where recording of the image in which the respective color regions are situated adjacently to one another is performed by using the excellent ink set.

This application is based upon and claims the benefit of priority from the prior Japanese Patent Application No. 2004-140282, filed on May 10, 2004, the entire contents of which are incorporated herein by reference.

What is claimed is:

1. An ink set, which is an ink set (A) constituted by a plurality of aqueous inks (a) and used together with an aqueous ink (B) containing a water-insoluble coloring material, wherein each of the plurality of aqueous inks (a) constituting the ink set (A) contains a water-soluble dye as a coloring material and at least one water-soluble organic solvent(s) serving as a poor solvent for the water-insoluble coloring material contained in the aqueous ink (B), wherein the total sum of the content(s) (mass %) of the at least one water-soluble organic solvent(s) contained in each of the plurality of aqueous inks (a) constituting the ink set (A) and serving as a poor solvent for the water-insoluble coloring material contained in the aqueous ink (B) is three times or more the content (mass %) of the water-insoluble coloring material contained in the aqueous ink (B), wherein at least one of the at least one water-soluble organic solvent(s) contained in each of the plurality of aqueous inks (a) constituting the ink set (A) and serving as a poor solvent for the water-insoluble coloring material contained in the aqueous ink (B) has a vapor pressure at 20° C. that is lower than the vapor pressure of water at 20° C. and is selected from polyethylene glycol having average molecular weight of 200, polyethylene glycol having average molecular weight of 600, 1,5-pentanediol, 2-pyrrolidone, and 1,2,6-hexanetriol, wherein the water-insoluble coloring material contained in the aqueous ink (B) is a pigment to the surface of which at least one selected from a group consisting of —COOM1, —SO$_3$M1, and —PO$_3$H(M1)$_2$ (M1 in the chemical formula represents hydrogen atom, alkali metal, ammonium, or organic ammonium) is bonded, directly or through another atomic group, wherein the water-soluble dye has an anionic group, and wherein the at least one water-soluble organic solvent(s) contained in each of the plurality of aqueous inks (a) constituting the ink set (A) and serving as a poor solvent for the water-insoluble coloring material contained in the aqueous ink (B) is capable of causing aggregation of the water-insoluble coloring material contained in the aqueous ink (B) on a recording medium, the aggregation being caused by reducing a charge amount of the water-insoluble coloring material, making a dispersion of the water-insoluble coloring material unstable.

2. The ink set according to claim 1, wherein the aqueous ink (B) contains at least one water-soluble organic solvent, and wherein $\in_{s1}$ is the relative permittivity (relative to the electric constant $\in_0$) of the water-soluble organic solvent whose content is the highest among the water-soluble organic solvents contained in the aqueous ink (B), $\in_{s2}$ is the relative permittivity (relative to the electric constant ∈₀) of the at least one water-soluble organic solvent(s) contained in each of the plurality of aqueous inks (a) constituting the ink set (A) and serving as a poor solvent for the water-insoluble coloring material contained in the aqueous ink (B), and $\in_{s1}$ and $\in_{s2}$ satisfy the relationship $\in_{s1} > \in_{s2}$.

3. The ink set according to claim 1, wherein the value of the relative permittivity $\in_{s1}$ at room temperature is 35 or less.

4. The ink set according to claim 1, wherein the water-soluble organic solvent whose content is the highest among all the water-soluble organic solvents contained in each of the plurality of aqueous inks (a) constituting the ink set (A) is a water-soluble organic solvent serving as a poor solvent for the water-insoluble coloring material contained in the aqueous ink (B).

5. The ink set according to claim 1, wherein the aqueous ink (B) containing the water-insoluble coloring material further contains a water-soluble organic solvent serving as a poor solvent for the water-insoluble coloring material.

6. The ink set according to claim 1, wherein the another atomic group is an alkylene group containing 1 to 12 carbon atoms, a substituted or unsubstituted phenylene group, or a substituted or unsubstituted naphthylene group.

7. The ink set according to claim 1, wherein the water-insoluble coloring material contained in the aqueous ink (B) is a carbon black.

8. The ink set according to claim 1, wherein the aqueous ink (B) is a black ink.

9. An ink jet recording method comprising a process of ejecting an ink with an ink jet method, wherein the ink includes a plurality of aqueous inks (a) constituting the ink set (A) according to claim 1.

10. An ink cartridge comprising a plurality of ink storage portions, wherein the ink storage portions store a plurality of aqueous inks (a) constituting the ink set (A) according to claim 1.

11. A recording unit comprising a plurality of ink storage portions and an ink jet head for ejecting an ink, wherein the ink storage portions store a plurality of aqueous inks (a) constituting the ink set (A) according to claim 1.

12. An ink jet recording apparatus comprising a plurality of ink storage portions and an ink jet head for ejecting an ink, wherein the ink storage portions store a plurality of aqueous inks (a) constituting the ink set (A) according to claim 1.

13. An image formation method that uses a plurality of aqueous inks (a) constituting the ink set (A) according to claim 1 and an aqueous ink (B) containing the water-insoluble coloring material according to claim 1 to form an image in which an image formed by the aqueous inks (a) constituting the ink set (A) and an image formed by the aqueous ink (B) containing the water-insoluble coloring material are situated adjacently to each other, characterized by comprising:
performing first scanning for applying the aqueous ink (B) containing the water-insoluble coloring material on an area of a recording medium to form an image; and
performing second scanning for applying at least one of the plurality of aqueous inks (a) constituting the ink set (A) on the area where the image has been formed due to the first scanning.

14. The image formation method according to claim 13, characterized by comprising:
performing the first scanning for applying the aqueous ink (B) containing the water-insoluble coloring material on the recording medium; and
performing the second scanning for applying at least one of the plurality of aqueous inks (a) constituting the ink set (A) after a time interval corresponding to one scanning operation.

15. The image formation method according to claim 13, wherein an ink is applied using a recording head in which an ejection port train for ejecting the aqueous ink (B) containing the water-insoluble coloring material and ejection port trains for ejecting a plurality of aqueous inks (a) constituting the ink set (A) are not aligned with each other in the sub-scanning direction.

16. An ink jet recording method comprising a step of ejecting a plurality of aqueous inks (a) constituting an ink set (A) in combination with an aqueous ink (B) containing a water-insoluble coloring material by an ink jet method,
wherein each of the plurality of aqueous inks (a) constituting the ink set (A) contains a water-soluble dye as a coloring material and at least one water-soluble organic solvent(s) serving as a poor solvent for the water-insoluble coloring material contained in the aqueous ink (B),
wherein the total sum of the content(s) (mass %) of the at least one water-soluble organic solvent(s) contained in each of the plurality of aqueous inks (a) constituting the ink set (A) and serving as a poor solvent for the water-insoluble coloring material contained in the aqueous ink (B) is three times or more the content (mass %) of the water-insoluble coloring material contained in the aqueous ink (B),
wherein at least one of the at least one water-soluble organic solvent(s) contained in each of the plurality of aqueous inks (a) constituting the ink set (A) and serving as a poor solvent for the water-insoluble coloring material contained in the aqueous ink (B) has a vapor pressure at 20° C. that is lower than the vapor pressure of water at 20° C. and is selected from polyethylene glycol having average molecular weight of 200, polyethylene glycol having average molecular weight of 600, 1,5-pentanediol, 2-pyrrolidone, and 1,2,6-hexanetriol,
wherein the water-insoluble coloring material contained in the aqueous ink (B) is a pigment to the surface of which at least one selected from a group consisting of —COOM1, —SO₃M1, and —PO₃H(M1)₂ (M1 in the chemical formula represents hydrogen atom, alkali metal, ammonium, or organic ammonium) is bonded, directly or through another atomic group,
wherein the water-soluble dye has an anionic group, and
wherein the at least one water-soluble organic solvent(s) contained in each of the plurality of aqueous inks (a) constituting the ink set (A) and serving as a poor solvent for the water-insoluble coloring material contained in the aqueous ink (B) is capable of causing aggregation of the water-insoluble coloring material contained in the aqueous ink (B) on a recording medium, the aggregation being caused by reducing a charge amount of the water-insoluble coloring material, making a dispersion of the water-insoluble coloring material unstable.

17. The ink set according to claim 1, wherein each of the plurality of aqueous inks (a) constituting the ink set (A) is a color ink.

18. An ink set comprising the ink set according to claim 17, and the aqueous ink (B) as a black ink.

19. The ink set according to claim 1, wherein the total content of water-soluble organic solvent(s) is in the range of from 3 mass % to 40 mass % and the content(s) of the at least one water-soluble organic solvent serving as a poor solvent is in the range of from 4 mass % to 40 mass % in each of the plurality of aqueous inks (a).

20. The ink set according to claim 1, wherein the water-insoluble coloring material is a pigment having a surface to which a group selected from $-C_6H_4-COOM1$ or $-C_6H_3-(COOM1)_2$ where M1 represents hydrogen atom, alkali metal, ammonium, or organic ammonium is introduced.

* * * * *